US006224812B1

(12) United States Patent
Allan et al.

(10) Patent No.: US 6,224,812 B1
(45) Date of Patent: May 1, 2001

(54) PROCESS FOR MOLDING OF A DETERGENT COMPOSITION

(75) Inventors: Peter Stewart Allan, Chalfont St Peter; John Martin Cordell; Graeme Neil Irving, both of Bebington; Suresh Murigeppa Nadakatti; Vijay Mukund Naik, both of Bangalore; Christine Ann Overton; Frederick Edmund Stocker, both of Bebington; Karnik Tarverdi, Harrow; John Colin Wahlers, Bebington, all of (GB)

(73) Assignee: Lever Brothers Company, division of Conopco, Inc., New York, NY (US)

( * ) Notice: Subject to any disclaimer, the term of this patent is extended or adjusted under 35 U.S.C. 154(b) by 0 days.

(21) Appl. No.: 09/078,751

(22) Filed: May 14, 1998

(30) Foreign Application Priority Data

| | | |
|---|---|---|
| May 16, 1997 | (GB) | 9710048 |
| Sep. 25, 1997 | (IN) | 560/97 |
| Dec. 19, 1997 | (GB) | 9726972 |

(51) Int. Cl.[7] .......... B29C 45/00; C11D 13/18; C11D 17/00

(52) U.S. Cl. .......... 264/328.1; 264/328.17; 510/447

(58) Field of Search .......... 264/571, 328.1, 264/328.2, 328.16, 328.17, 50; 510/447, 449, 450, 440

(56) References Cited

U.S. PATENT DOCUMENTS

| | | | |
|---|---|---|---|
| 2,048,286 | 7/1936 | Pease . | |
| 2,398,776 * | 4/1946 | Bodman . | |
| 2,471,814 | 5/1949 | Cousino . | |
| 2,987,484 | 6/1961 | Lundberg et al. . | |
| 3,723,325 | 3/1973 | Parran, Jr. . | |
| 3,779,685 | 12/1973 | Pisoni . | |
| 4,062,792 | 12/1977 | McNabb . | |
| 4,164,385 | 8/1979 | Finkensiep . | |
| 4,183,448 | 1/1980 | Nash . | |
| 4,189,802 | 2/1980 | Lansbergen . | |
| 4,201,743 | 5/1980 | Perla et al. . | |
| 4,478,735 * | 10/1984 | Yazaki et al. | 510/452 |
| 4,565,647 | 1/1986 | Llenado . | |
| 5,009,814 | 4/1991 | Kelkenberg et al. . | |
| 5,013,233 | 5/1991 | Semmekrot . | |
| 5,147,579 | 9/1992 | Dean . | |
| 5,389,279 | 2/1995 | Au et al. . | |

FOREIGN PATENT DOCUMENTS

| | | |
|---|---|---|
| 0530156 | 3/1903 | (EP) . |
| 2112945 | 6/1972 | (FR) . |
| 6405 | 9/1913 | (GB) . |
| 250443 | 4/1926 | (GB) . |
| 725835 | 3/1955 | (GB) . |
| 875818 | 8/1981 | (GB) . |
| 2164895 | 4/1986 | (GB) . |
| 94/13778 | 6/1994 | (WO) . |

OTHER PUBLICATIONS

Carr, H. Y., Purcell, E.M., Physical Review, vol. 94 (1954).

Meiboom, S., Gill, D., Review of Scientific Instruments, vol. 29 (1958).

* cited by examiner

*Primary Examiner*—Jill L. Heitbrink
(74) *Attorney, Agent, or Firm*—Ronald A. Koatz

(57) ABSTRACT

A process for forming detergent bars by injection moulding in which a pressure is applied to a partially structured detergent composition to deliver it to a mould. The detergent composition can be delivered to the mould in a substantially semi-solid state, at a temperature below 70° C. and at a pressure at the point of injection of greater than 20 psi. Apparatus for forming detergent bars according the invention are also described

2 Claims, 6 Drawing Sheets

PROCESS FOR MOLDING OF A DETERGENT COMPOSITION

TECHNICAL FIELD

The present invention relates to a process and apparatus for forming detergent bars and detergent bars formed thereby. The detergent bars can be of the personal or fabric wash type.

BACKGROUND AND PRIOR ART

Detergent bars are conventionally manufactured by one of two methods; (i) milling followed by extrusion ("plodding") and stamping (sometimes referred to as the "milling" process), or (ii) casting.

In the milling process, a preformed solid composition comprising all components of the bar is typically plodded, i.e. extruded through a nozzle to form a continuous "rod" which is cut into smaller pieces of predetermined length, commonly referred to as "billets". These "billets" are then fed to a stamper or, alternatively, are given an imprint on one or more surfaces using, for example, a die of the same dimensions as the bar surface which is hit with force such as with a mallet or a die in the shape of a roller, or simply cut.

There are several shortcomings associated with the milling method of detergent bar manufacture.

A problem encountered with the stamping process is die-blocking, in which amounts of residual detergent left on die halves build up during continued use of the dies. Die blocking can lead to poor or even non-release of the bars from the die surface and/or visible imperfections on the bar surface. Extrusion and stamping also require that the extruded billet be in a substantially "rigid" form at the process conditions. Die blocking and "soft" billets may be caused by soft detergent compositions, for example compositions containing a large proportion of ingredients which are liquid at processing conditions, and/or may also be a result of the shear and extensional forces to which the detergent composition is subjected by the milling process, e.g. the extrusion and/or stamping.

Milling is therefore only suitable for formulations which are plastic and yet which are not soft or do not become soft or sticky due to the shear degradation at operating temperatures of the manufacturing equipment, typically in the range of ambient ±30° C.

Milled bars also tend to have an oriented structure, aligned along the axis of extrusion. They also tend to form cleavage planes within the bar, which weaken the bar and, with the repeated wetting and drying of the bar in use, can lead to wet-cracking along the planes. Wet-cracking is highly undesirable being both unsightly and leading to bar fracture.

The other conventional method for the manufacture of detergent bars is casting. In casting, detergent compositions in a heated mobile and readily pourable state are introduced into the top of an enclosed cavity (i.e. a mould) of the desired shape and the temperature of the composition reduced until it solidifies. The bar can then be removed by opening the mould.

In order to be castable, the detergent formulation must be mobile and readily pourable at the elevated temperatures employed. Certain detergent formulations are viscous liquids or semi-solids at commercially realistic elevated temperatures and therefore do not lend themselves to casting.

Furthermore, in the casting process, the detergent melt tends to cool slowly and unevenly. This can lead to unwanted structural orientations and segregation of ingredients. Often some sort of active cooling system is employed in order to achieve acceptable processing times. Even when a cooling system is employed, cooling is still generally uneven through the detergent composition in the mould.

A major problem with the casting process is that detergent compositions in the moulds tend to shrink as they cool. This is highly undesirable as the mould is intended to impart a distinctive shape on the bar and/or a logo of some kind. Shrinkage can take the form of dimples, wrinkles or voids, or a depression at the fill point of the bar.

Therefore, there is a need for a process and apparatus for forming detergent compositions into good quality bars (i.e. bars, for example, of good appearance and physical characteristics) which overcomes the identified problems and disadvantages associated with the milling process, and which also avoids the problems associated with casting.

U.S. Pat. No. 2,987,484 (Procter & Gamble) discloses a closed die moulding process in which a basically non-soap fluid mixture of synthetic detergent and a binder-vehicle is rapidly injected through a small orifice into a substantially closed die, the fluid mixture being capable of solidifying into a shape-sustaining form.

The process involves heating the composition to a temperature in the range 70° C. to 150° C. so that the composition melt is in a fluid-injectable state. In all the examples, the temperature is in the range 82–150° C. The melt is circulated through a continuous injection circuit comprising a crutcher in which the fluid mixture is mixed and heated, a pipeline in a loop with the crutcher, a heat exchanger in the pipeline to stabilise the temperature of the melt, and a pump to maintain the circulating and injection pressure.

The viscosity of the heated melt at the conditions of injection is 2–50 Pa.s. This is described as being dependent on the intensity of shear and the temperature and a function of the composition. However, no specific shear rates are given for this viscosity range. A melt having a viscosity in the range 2–50 Pa.s at injection conditions is described as being thick enough so as not to splash in the mould, entrap air or run out of the mould air vents, whilst being thin enough to permit complete filling of the mould prior to solidification of any composition therein and to avoid excessive injection pressures. Suitable injection pressures range from about 1–20 psi, but are preferably in the range 2–10 psi. In all the examples, the injection pressure is between 5–8 psi. Pressures which are too high are described as causing splashing in the mould and as increasing the density of the melt.

U.S. Pat. No. 2,987,484 also teaches, and it is an essential feature of the claims, that for the process to work, the fluid mixture must be cooled through a nigre (isotropic liquid) plus crystals phase. Furthermore, it is taught that detergent fluid mixtures in the neat or middle (anisotropic liquid) phases are not suitable for closed die moulding because of the excessive viscosity of these phases and the tendency for undesirable complexes to form in these phases. In addition, U.S. Pat. No. 2,987,484 states that successful closed die moulding necessitates avoidance of cooling through neat and middle phases (column 4, lines 8 to 27).

U.S. Pat. No. 2,989,484 is described as overcoming the problems associated with conventional methods of bar manufacture and in particular those associated with milling. However, the solution described has several inherent drawbacks, most of which are common to the casting and framing processes. It is very energy intensive, energy being required to heat the detergent compositions to the high temperatures at which the fluid mixture is injected and subsequently to cool the moulds in order to reduce the solidifying times to acceptable levels. Furthermore, by injecting the compositions as high temperature fluids, the process leads to problems with shrinkage of the bars as they solidify. It also fails to address the problem of segregation of ingredients as the detergent composition cools in the mould. The detergent composition in the apparatus is permanently sheared by being pumped through pipes or by a mixer in the crutcher.

Conventional processes of detergent bar manufacture operate either by structuring the detergent composition totally within the mould, requiring initial high heat energy input (e.g. casting), or structuring the detergent composition totally outside the mould/bar-shaping means, resulting in the processing of a rigid solid material prior to moulding (e.g. extrusion and stamping). The latter type of process subjects the structured material to high shear energy (e.g. in stamping). In attempting to overcome the shortcomings of such processes, and in particular those of the milling and framing processes, the process described in U.S. Pat. No. 2,987,484 does not deviate from this general pattern—there is a high energy input in terms of the relatively high temperatures used. From this perspective, U.S. Pat. No. 2,987,484 merely provides an alternative casting process in which the detergent material is injected, rather than being poured, into a mould.

The present inventors have found that the problems present in the methods of the prior art can be overcome by operating in a processing window whereby structure is developed partially outside and partially inside the mould. In this way, any disruptive shear effects present in the process will only act on a partially-developed structure and sufficient structure can form in the mould to produce good quality bars. In this way, the structuring of the detergent composition is damaged to a much lower degree during bar formation and higher injection pressures can be tolerated, without disrupting the partial structure.

SUMMARY OF THE INVENTION

By partially structuring a detergent composition prior to delivering it to a mould in an injection moulding process, good quality bars can be obtained and the problems of shrinkage, oriented structure and segregation of ingredients are significantly reduced. In addition, production benefits such as shorter bar release times are also achievable.

Thus, according to a first aspect, the present invention provides a process for forming detergent bars comprising applying pressure to a detergent composition to deliver the detergent composition to a mould characterised in that the detergent composition is at least partially structured when it enters the mould.

Preferably, it is the continuous phase of the detergent composition that is at least partially structured.

In the present invention, detergent compositions are considered to be at least partially structured if they contain molecular structure which will affect the viscosity properties of the detergent composition. Additionally or alternatively, detergent compositions may be considered to be at least partially structured if they contain a structuring agent which increases the viscosity of the detergent composition.

Preferably, the detergent composition is in a semi-solid state when delivered to the mould.

In a second aspect, the present invention provides a process for forming detergent bars comprising applying pressure to a detergent composition to deliver the detergent composition to a mould characterised in that the pressure at the point at which the detergent composition enters the mould is greater than 20 psi for at least part of the time over which the detergent composition is entering the mould.

In a third aspect, the present invention provides a process for forming detergent bars comprising applying pressure to the detergent composition to deliver the detergent composition to a mould characterised in that the detergent composition is at a temperature below 70° C. when entering the mould.

By delivering the detergent composition to the mould at a lower temperature than that described in the prior art, the process is less energy intensive and the bars cool to a temperature at which they are sufficiently solid to be ejected from the mould more quickly.

The present inventors have designed apparatus for forming detergent bars by injection moulding. More particularly, the present inventors have provided a means for feeding detergent composition to the means for applying pressure.

Thus, the present invention provides an apparatus for forming detergent bars comprising a means for applying pressure to a detergent composition to deliver the detergent composition to a mould and a substantially separate means adapted for feeding detergent composition to the means for applying pressure.

The detergent composition may be introduced into the means for feeding in any suitable state, such as, for example, fluid, semi-solid or particulate form.

We have discovered that a particularly effective means of feeding detergent compositions, including compositions supplied in a fluid state, in an injection moulding process is provided by means of screw extruders.

Thus, the feeding means preferably comprises a screw feeder.

In another aspect, the present invention provides detergent bar obtainable by the process of the present invention.

We have found that the process of the invention is well suited for incorporating additive or benefit agents which are immiscible with the detergent composition. Accordingly, the present invention provides detergent bars obtainable by the process of the present invention comprising a detergent composition and components immiscible with the detergent composition, wherein the immiscible component is present in non-spherical domains.

In a further aspect, the present invention provides for a method for incorporating an additive or benefit agent into a detergent bar, comprising adding the additive or benefit agent to a detergent composition which is at least partially structured and applying a pressure to the detergent composition containing the additive or benefit agent so as to deliver it to a mould.

In a preferred embodiment, the additive or benefit agent is immiscible with the detergent composition.

Unless specified more generally, references herein to the invention or to any preferred features apply to all aspects of the invention.

DETAILED DESCRIPTION OF THE INVENTION

By "detergent bar" is meant a tablet, cake or bar in which the level of surface active agent, which comprises soap, synthetic detergent active or a mixture thereof, is at least 5% by weight based on the bar. The detergent bar may also comprise benefit agents for imparting or maintaining desirable properties for the skin. For example, moisturising agents may be included.

The detergent compositions may comprise homogeneous components or mixtures of components, or may comprise material suspended or dispersed in a continuous phase.

Detergent compositions to be delivered to the mould can be in any form capable of being delivered to the mould. For example, the composition may be in a substantially fluid (e.g. molten, molten dispersion, liquid), substantially semi-solid or substantially solid form, so long as the composition is sufficiently plastic to allow the pressure applying means to deliver it to a mould as would be understood by the person skilled in the art.

Structure

The detergent composition should be compared with a detergent composition which is at the same temperature as the detergent composition under consideration and of substantially the same composition, except for having no structure and/or structuring agent present, whereby it can be ascertained whether viscosity is increased.

Structure can be provided, for example, by liquid crystal formation, a polymeric structuring agent or clay, or a sufficient volume of a dispersed solid component which will affect the viscosity. A solid component can provide structure by interacting to form a network within the detergent composition or through the simple physical interaction/contact of the solid particles with one another or with the continuous phase.

With regards to detergent compositions, and in particular detergent compositions in a substantially fluid or liquid state, there are two general and separate classes of compositions, those with structurally isotropic phases and those with structurally anisotropic phases. Those phase states that are structurally isotropic are liquid, cubic liquid crystal phases and cubic crystal phases. All other phases are structurally anisotropic.

Structured liquids can be "internally structured", whereby the structure is formed by primary ingredients, preferably by surfactant material (i.e. anisotropic or having liquid crystal phases), and/or "externally structured" whereby a three dimensional matrix structure is provided by using secondary additives, for example, polymers (e.g. Carbopols), clay, silica and/or silicate material (including in situ formed aluminosilicates).

Such secondary additives may be present at a level of 1–10% by weight of the detergent composition.

The existence of internal structure in the detergent composition may be due to the components used, their concentration, the temperature of the composition and the shear to which the composition is being or has been exposed.

In general, the degree of ordering of surfactant containing systems increases with increasing surfactant and/or electrolyte concentrations. At very low concentrations of surfactant and/or electrolyte, the surfactant can exist as a molecular solution, or as a solution of spherical micelles, both of these solutions being isotropic, i.e. they are not structured. With the addition of further surfactant and/or electrolyte structures of surfactant material may form. Various forms of such structures exists, e.g. bilayers. They are referred to by various terms such as rod-micelles, anisotropic surfactant phase, planar lamellar structures, lamellar droplets and liquid crystalline phases (most of which are anisotropic but which may be isotropic). Various examples of fluid compositions which are internally structured with surfactant material are given in H. A. Barnes, "Detergents", Ch.2. in K. Walters (Ed), "Rheometry: Industrial Applications", J. Wiley & Sons, Letchworth 1980. Often different workers use different terminology to refer to structures which are really the same. For example, lamellar droplets are called spherulites in EP-A-0151884.

The presence of such internal structuring, ordering or anisotropy may be typically revealed by the temperature/viscosity/shear profile of the composition in a manner known to the person skilled in the art. Frequently, the presence of molecular structure gives rise to non-Newtonian fluid behaviour.

The presence and identity of a surfactant structuring system in a detergent composition may be determined by means known to those skilled in the art for example, optical techniques, various rheometrical measurements, X-ray or neutron diffraction, and sometimes, electron microscopy.

As will be known to the person skilled in the art, molecular structure may be detected by the use of polarised light microscopy. Isotropic phases have no efect upon polarised light, but structured phases will have an effect upon polarised light and may be birefringent. An isotropic liquid would not be expected to show any kind of periodicity in X-ray or neutron difraction micrographs, whereas molecular structure may give rise to first, second or even third order periodicity, in a manner which will be known to the person skilled in the art.

Preferably, the detergent composition is in a semi-solid state when delivered to the mould. A detergent composition may be considered to be in a semi-solid state if sufficient structure is present in the composition so that it no longer behaves like a simple liquid, as would be understood by the person skilled in the art.

Contrary to the prior art, we have found that it is possible to obtain detergent bars having good physical properties by cooling a detergent composition from or through a neat and/or middle liquid crystal phase. Furthermore, we have found that it is not essential for the detergent composition to be cooled through a nigre plus crystals phase in order to achieve successful bar formation by an injection moulding process.

Accordingly, the detergent composition entering the mould preferably cools from and/or through an anisotropic liquid crystal phase.

The processes and apparatus of the present invention therefore provide a means for producing good quality detergent bars from detergent formulations which do not lend themselves to the milling or casting methods of manufacture, for example, formulations, in particular personal wash formulations, which have a high concentration of ingredients in a liquid state at ambient conditions, formulations which have a shear-sensitive solid structure, and formulations which are too viscous to cast.

One of the benefits provided by the present invention is a reduction in the problems associated with shrinkage of the bar in the mould as the bar cools. This results in greater accuracy in replication of the surface contours and form of the cavity. In particular, good logo reproduction can be obtained.

In order to overcome the problems associated with the process of the prior art, the detergent compositions of the present invention are typically more viscous than those of the prior art. Consequently, the pressure required to deliver a detergent composition to a mould is greater.

Pressure

The pressure applied to the detergent composition in contact with the pressure applying means is referred to herein as the "applied pressure", and references to "apply" and "applying" pressure to a detergent composition refer to the applied pressure. As the detergent composition may be relatively viscous, the pressure experienced by the composition further down the flow path may be lower.

"Injection pressure" is the pressure on the detergent composition at the point of entering the mould.

The inventors have discovered that higher pressures than those of the prior art can be used to deliver a detergent composition to a mould without compromising the final molecular structure of the detergent bar. As in the second aspect of the invention, use of injection pressures in excess of 20 psi can allow relatively viscous compositions to be fed to a mould.

Applied pressures may be in the order of 10–50 psi. However, higher applied pressures, for example up to 1000 psi, may be used to deliver relatively viscous (e.g. semi-solid) detergent compositions to the mould. The applied pressure will typically not exceed 750 psi, and more typically not exceed 500 psi. Excessive shear can be avoided at such pressures by controlling process parameters such as temperature, flow rate and apparatus design.

The injection pressure is typically greater than 20 psi, preferably greater than 29.4 psi, and more preferably greater than 50 psi. Because the detergent compositions being injection moulded are at least partially structured and/or at relatively low temperatures, significantly higher injection pressures than those reported in U.S. Pat. No. 2,987,784 may have to be employed. For example, the detergent composition may be in a substantially semi-solid form. Injection pressures greater than 200, greater than 400, and even greater than 700 psi may be used.

We have found that the problems associated with bar shrinkage in the mould may be reduced, if there is a need to do so, by delivering further detergent composition to the mould as the volume in the mould cools or becomes solid. To achieve this a "holding pressure" is placed on the detergent composition in the mould. In this manner the total volume in the mould can be maintained and shape reproduction further improved.

Furthermore, use of a "holding pressure" minimises weld lines (i.e. interfaces between flow fronts of detergent material inside the mould) and improves logo definition.

Thus, it is possible to obtain detergent bars with reduced shrinkage and having good physical properties by applying a pressure to a detergent composition to deliver the detergent composition to a mould and continuing to apply the pressure on the detergent composition for a period after the mould has been filled.

The pressure created in the mould by continuing to apply pressure to a detergent composition entering a mould after the mould has been filled is herein referred to as the "holding pressure". The detergent compositions may be subjected to a high holding pressure within the mould. For example, such pressures may be up to 1000 psi.

All pressure figures are psi gauge (psig), i.e. the level above or below atmospheric pressure.

The time over which a "holding pressure" is developed by continuing to apply pressure to the detergent composition after the mould has been filled is referred to herein as the "holding time". The holding time will vary depending on the properties of the detergent composition being delivered to the mould. For example, compositions being delivered to a mould in a molten state and at high temperatures may need a longer holding time than compositions which are delivered to a mould in a semi-solid state and/or at a lower temperature.

Typically, the holding time is less than 2 minutes, preferably less than 1 minute, more preferably less than 30 seconds, and most preferably less than 10 seconds. The holding time may be very short, for example, less than 1 second.

Temperature

The inventors have discovered that detergent compositions at lower temperatures than those typically employed by the prior art can be delivered under pressure to a mould without compromising the final molecular structure of the detergent bar. Where the presence of structure in a detergent composition to be delivered to the mould can be clearly identified, it may be acceptable to have the detergent composition at a temperature of 100° C. or more when it enters the mould. However, as in the third aspect of the invention, a detergent composition can be delivered a mould under pressure to a mould at a temperature of less than 70° C. when entering the mould. Excessive shear can be avoided at such temperatures by controlling process parameters such as flow rate and apparatus design.

Detergent compositions do not usually have a simple melting point, but pass instead from a solid form, to a semi-solid form and then to a fluid (or molten) form as the temperature increases. Any practical detergent composition in bar form will be in a substantially solid state at ambient or normal storage and/or use temperatures, which are normally in the range up to 30–40° C.

Accordingly, the detergent composition preferably enters the mould at a temperature above ambient, e.g. preferably above 30° C., more preferably above 40° C.

Of course, the lower the temperature, the less energy is required to heat the composition from the ambient, the more quickly the bar cools and the less the tendency for the bar to shrink.

It is a particular advantage of the present invention that the detergent composition can enter the mould at a lower temperature than in a simple casting technique. When heating solid detergent compositions, less heat (i.e. energy) may be required as the operating temperatures can be lower. When cooling liquid detergent, no heating may be required at all. The present invention therefore offers economy in operation.

Typically, the detergent composition may be at a temperature of 60° C. or less.

The present invention is particularly suited to detergent compositions which undergo supercooling, i.e. thermal energy can be removed outside the mould without the final bar structure forming.

Injection moulding apparatus

Injection moulding is a process which is presently particularly used in the moulding of synthetic polymeric thermoplastic articles, particularly thermoplastic articles having thin cross sections and complex shapes.

In essence, an injection moulding apparatus for plastic material comprises a substantially closed mould and a means for delivering the plastic material under raised pressure into the substantially closed mould. Preferably there are means for raising the temperature of the plastic material to a temperature where the material is flowable under pressure. The process of the present invention can be carried out using such known injection moulding apparatus, with or without any means for heating the feed. Preferred modifications according to the present invention are discussed below.

Detergent compositions of the present invention may be injection moulded using an apparatus comprising a means for applying pressure to the detergent composition so as to drive the detergent composition into a mould. A "means for applying pressure" is defined as a device capable of containing a material and of applying a pressure to that material so as to force it into a mould.

Suitable types of apparatus that lend themselves to driving detergent composition into a mould include positive displacement pump-type arrangements such as, for example, piston pump (which can include extruders), gear pump and lobe pump-type arrangements.

A suitable apparatus is a simple ram extruder in contact with a mould. Such apparatus typically comprises a reservoir or barrel for the detergent composition, a plunger for applying pressure to the material in the reservoir and an exit port through which the detergent composition is driven, directly or indirectly, into a mould. Simple ram extruder apparatus is particularly suited to injection moulding of detergent compositions in, for example, a semi-solid form.

Injection moulding apparatus as described above may be used for the processes of the invention.

In a preferred embodiment, the detergent composition is preferably at least partially structured when delivered to the mould. Preferably, the detergent composition is in the semi-solid form when delivered to the mould. Of course, the present invention also provides for detergent compositions to be injection moulded in a substantially fluid form.

Some detergent compositions may be made permanently sticky if they are injection moulded under the wrong conditions. That is, some solid detergent compositions have a complex molecular structure which may be disrupted if the solid is exposed to excessive shearing stresses. The molecular structure may not be re-established after such shearing, so that the detergent composition will remain in a sticky, unusable state.

It is accordingly desirable to ensure that such detergent compositions are not exposed to excessive shear during delivery to the mould.

In order to control the shear to which the detergent composition is subjected, the nature of the detergent composition itself needs to be taken into account, in particular its viscosity and molecular structure at various temperatures. To control the shear, one can control process parameters such as the temperature, pressure applied to the composition, flow rate of detergent composition in the apparatus and configuration of the apparatus. Configurations such as severe bends, constrictions and fast moving parts may subject the detergent composition to high shear.

It has been found that by delivering the detergent composition at an appropriate temperature to the mould, the shear-sensitive structure may not be fully formed and the structure of the composition at room temperature is not lost. Any suitable method may be used to control the temperature of the detergent composition being injected into the mould. It may be supplied at a temperature suitable for delivery to the mould and require no alteration to its temperature. Alternatively, and preferably, the temperature of the detergent composition is altered before or whilst it is fed to the mould by using heating or cooling means to raise or lower the temperature of the composition as is appropriate.

Preferably, the state of the detergent composition is altered before or whilst it is fed. For example, it may pass from a liquid phase to a semi-solid state. Alternatively, it may pass from a solid to a semi-solid state.

Any suitable cooling or heating means may be applied to the injection moulding apparatus in which the detergent composition is contained/passes during the injection moulding process.

Suitable heating and cooling means are well-known to the skilled person in the art. For example, a suitable cooling means is a cooling jacket containing a cooling medium, and suitable heating means include, for example, electrical heating jackets containing a heating medium or heat exchangers of various forms.

A high temperature may be maintained near the point at which detergent composition is fed into the mould, so as to prevent blockage due to solidification.

A plurality of separately controllable heating means or cooling means may be provided at different positions in the apparatus. A stepped temperature profile can then be provided in the direction of flow of detergent composition. For example, the temperature may increase or decrease in steps.

Detergent compositions often come in solid particulate forms (e.g. pellets) which are then either extruded and stamped in a milling process, or, melted and cast in a casting process. Known injection moulding apparatus used in the plastics industry normally uses particulate plastic starting material which flows easily from a hopper. In contrast, detergent compositions in particulate form may be sticky and flow relatively poorly. Therefore special means may be required in order to ensure good feed of detergent composition to the apparatus.

The inventors have also observed that some detergent compositions are produced and supplied in a high temperature, molten state. Therefore means for feeding liquid detergent composition to the means for applying pressure to the detergent composition will be required.

Accordingly, the present invention provides an apparatus for forming detergent bars comprising a means for applying pressure to a detergent composition to deliver the detergent composition to a mould and a substantially separate means adapted to feed detergent composition to the means for applying pressure to the detergent composition.

The feeding means are substantially separate in that no parts of the feeding means have any significant role in applying pressure to the detergent composition. Of course, the feeding means is suitably in fluid connection with the means for applying pressure to the detegrent composition, whereby the detergent composition maybe readily fed into the means for applying pressure.

Examples of suitable feeding means include a conveyor, a container with a tapering lower section, an agitator, a ram feeder, a screw feeder or any number thereof in any combination.

In a preferred embodiment, the detergent composition is supplied to the feeding means in a substantially solid (e.g. particulate) or semi-solid form. "Particulate form" encompasses pellets, flakes, noodles, granules and chips as are well-known in the art.

Where a detergent composition is supplied in a substantially solid form, a heating means may be required to heat the material in the apparatus (e.g. in the reservoir in the case of a ram extruder apparatus) so that it becomes and/or remains flowable under pressure.

If the detergent composition is provided in a substantially fluid form, then a cooling zone may be employed instead of or in addition to a heating zone. If the molten feed is supplied at a temperature above 70° C., it is preferably cooled prior to being delivered to the mould. Of course, it is understood that detergent compositions may be introduced into the mould at temperatures greater than 100° C. Furthermore, a heating apparatus may be used to maintain such a high temperature.

It is preferred feature of the feeding means that it is capable of supplying a continuous feed of detergent composition.

The means for feeding detergent material may feed the composition to the means for applying pressure or to a zone preceding the means for applying pressure such as a heating or cooling zone. In a preferred embodiment, the means for feeding detergent material feeds the composition into an accumulator zone which provides a interface between the continuous operation of the feeder and the discontinuous injection cycle of the pressure applying means.

Means for controlling the temperature of the detergent composition may be provided at any position in the injection moulding apparatus. For example, such heating or cooling means may be provided in the means for applying pressure, in the feeding means or in a separate zone, or in any combination thereof. A separate heating zone may be placed, for example, between the means for feeding detergent material and means for applying pressure.

The present invention provides for the use of screw extruders as part of the injection moulding apparatus, either as the feeding means, pressure applying means or both. In a reciprocating injection moulder, the means for applying pressure to the prepared (e.g. thermally heated) material is provided by the screw itself. Typically, the screw is movable along its axis away from the mould. As flowable material is delivered into the accumulation zone at the end of the screw barrel, the pressure generated there is allowed to push the screw back. In order to apply the pressure to the accumulated molten material (the "shot"), the screw is forced (usually using hydraulic pressure) forwards towards the accumulation zone thereby placing pressure on the material there, which moves through a nozzle into the mould. A check valve or specially designed screw tip prevents material flowing back into the screw flights.

The means for applying pressure to the detergent composition may comprise the tip of a screw extruder, as described above for known injection moulding apparatus. Alternatively, separate means for delivering detergent under pressure may be used, as set out below.

Preferably, the means for feeding detergent composition comprises a feeder in the form of a screw feeder. This is found to give particularly smooth feed.

Screw geometry may be designed to suit the formulation being processed. The rotational speed of the screw or screws is controllable to provide an acceptable flow rate of material to the accumulation zone or means for applying pressure, without applying unacceptable shear to the detergent.

There are particular problems with fluid detergent compositions. Single screw extruders rely on drag flow for conveying, and therefore to convey fluids they need to be specifically designed with a close clearance and/or inclined so that gravity aids the forward flow of material. It is accordingly preferred to have two parallel screws with intermeshing, preferably self-wiping flights which provide positive displacement to propel detergent composition forwards. The screws may rotate in opposite directions (counter-rotating) but are preferably co-rotating to reduce the reverse pressure flow. Such twin-screw extruders with intermeshing flights for delivering liquids or solids are known to the skilled person.

It may be preferable not to employ a displaceable screw to apply pressure to the detergent composition to deliver it to the mould. Instead, a pressure chamber may be provided, where material can accumulate, comprising at least one wall defined by a piston which is movable to increase or decrease the volume of the pressure chamber, and at least one injection nozzle.

In a preferred embodiment, the screw extruder, in addition to feeding material for injection moulding into the means for applying pressure, will also perform the function of preconditioning the material to a desired physical state for injection. By providing the screw extruder with one or more heating and/or cooling zones, and by selecting, for example, appropriate screws, screw alignment and screw speed, the material fed into the extruder can be intimately mixed and structured to whatever extent is required for the particular injection moulding process being used and product characteristics sought. For example, a preferred embodiment of the present invention is that material be injected in a substantially semi-solid state.

In addition, the feeding means, preferably a screw extruder, can contain intermediate ports for degassing and/or for adding further ingredients. Additives, such as, for example, dyes and fragrances and other benefit agents can also be added through intermediate ports along the length of the screw feed.

Using a screw feed with a temperature profile, it is possible to add ingredients and/or additives and/or benefit agents to the bulk flow of material in the feeder at a specific temperature. In addition, the material in the screw feed can be mixed and/or structured to a greater or lesser extent as is moves within the screw feed depending on the equipment and process parameters employed. It is thus possible to add ingredients and/or additives and/or benefit agents to the bulk flow of material when it is at a chosen level of viscosity and/or mixing and/or structuring.

Furthermore, it is also possible for soap formation (e.g. saponification) or non-soap detergent surfactant formation (e.g. neutralisation of anionic surfactant acid precursors) to take place within the screw extruder, more particularly the first part of the screw extruder.

In addition to degassing, gas (e.g. air) can also be added to the detergent composition to be injection moulded in order to produce, for example, reduced density or floating bars. Preferably, gas would be added in the screw extruder stage.

Injection nozzle

The means for applying pressure to the detergent composition may be connected to the mould by a simple passage, or a passage having non-return means or connections for bypass ducts, to allow quick withdrawal of the pressurizing means after the mould is filled and smooth operation of the apparatus.

In a preferred embodiment, however, the detergent composition is fed through a nozzle whose length is a significant proportion (at least half, preferably at least three quarters) of the length of the internal volume of the mould. It has been found that there can be a problem in simple filling with jetting or "snaking" of the material in the mould. By providing a nozzle which extends substantially to the distant end of the mould, good fill has been found to be possible. Preferably, the nozzle and mould move relative to each other whilst the detergent composition is being supplied. The mould may be moved with respect to the means for applying pressure and/or the nozzle may be moved with respect to the mould whilst the detergent composition is being supplied. The rate at which the nozzle and mould move relative to each other is preferably matched to the rate of detergent delivery so that the nozzle remains just below the surface of detergent composition in the mould. This has been found to give particularly good fill. In a preferred embodiment, the nozzle is moved with respect to the mould.

The nozzle may be heated or pre-heated in order, for example, to prevent any of the detergent composition solidifying (depositing) in the nozzle and thus inhibiting smooth delivery of the composition to the mould.

Preferably, the diameter of the injection nozzle for use with the means for delivering detergent composition under pressure is small. Preferably the diameter is in the range 1 to 20 mm, preferably 5 to 10 mm, most preferably about 8 mm in diameter and of circular section.

Mould

The mould of the present invention may be constructed of any suitable material, for example a rigid material with good mechanical strength. Where rapid cooling is desired, a material with high thermal conductivity may be preferred. Preferably the mould comprises a material selected from metals and their alloys (for example, aluminium, brass and other copper alloys, steels including carbon and stainless steel), sintered forms of metals or metal composites, non-metallic materials such as ceramics, composites, and thermosetting plastics in porous or foamed forms.

Moulds may comprise rigid and non-rigid materials, for example, non-rigid plastics may be employed. The mould may form part or the whole of the packaging of the detergent bar product. In this respect, the packaging may be of a rigid nature or it may be non-rigid, e.g. a wrapper. For example, the inner lining of a rigid mould may comprise a "wrapper" for the detergent bar product so that a wrapped bar is released from the mould. The mould may also comprise an expandable lining within a cavity defined by the mould, the lining expanding to fill the cavity as detergent composition is delivered to the mould. Such linings and wrappers that may be released with the bar may be integral parts of the product packaging or may be removed once the bars are released, e.g. they may merely be used to facilitate easy release of the bars from the mould.

The mould may be pre-cooled or preheated prior to delivery of detergent composition to the mould. The internal surface of the mould may be preheated to a temperature, for example, in excess of the delivery temperature and/or the melt temperature of the composition. Such preheating of the mould has been found to provide for a smoother, more glossy finish to the bars.

After delivery of detergent, the mould may be cooled to encourage rapid solidification of the detergent. Any suitable coolant may be used, e.g. air, water, ice, solid carbon dioxide or combinations thereof, depending on the speed of cooling and the end temperature required. Preferably, at least part of the external face of the mould is provided with a means to improve cooling efficiency of the mould after injection. In preferred embodiments of the invention, such means comprise fins or ribs for air cooling or jackets for circulation of a coolant liquid.

The mould suitably comprises at least two rigid complementary dies adapted to be fitted to each other and withstand the injection and holding pressure, each die corresponding to a respective portion of the desired shape of moulded article, said dies when in engagement along the contacting portion of their rims defining a cavity corresponding to the total shape of the moulded article. The use of multiple part moulds comprising at least two die parts allows for the manufacture of highly diverse 3-dimensional shapes; for example circular, oval, square, rectangular, concave or any other form as desired.

In a mould comprising at least two die parts, at least one of said dies may be provided with a sealing means along the contacting portion of the rim thereof. More preferably, said sealing means comprises an elastomeric gasket.

The mould is provided with an internal surface, the size and shape of which may vary depending on the form of the final product. The internal surface of the mould may be coated in part or in total with a material having good release characteristics, such as low surface energy, or other properties, as described for instance in WO97/20028. Examples of such materials include fluoroplastics and fluoropolymers, silicones, and other elastomeric materials. The thickness of the coating is preferably less than 1 mm, more preferably less than 50 microns. The internal surface of the mould may be flat, concave or convex or any other shape as desired. The shape may be such as to accommodate bar shrinkage without detracting from the final bar appearance, e.g. very convex surfaces can be used.

The internal surface of the mould is optionally provided with mirror images of inscriptions or logos or figures desired on the surface of the moulded article, either as projections or depressions.

To ensure easy detachment of the article from the mould without distortion or damage to the inscription on the article the inscription may be designed such that the rim of the mirror image of the inscription is not exactly perpendicular to the die surface, but is appropriately beveled. To further prevent distortion or damage to the inscription or logo or figure, the finish on the inner die surface should be free from burrs and blemishes and preferably be carefully polished.

Leakage of material from moulds comprising die parts may be prevented by having the joining surfaces of the dies closely matching, e.g. by lapping or by providing a gasket. In the case of high viscosity materials, flat face contact is sufficient. The two dies are held together by the use of nuts and bolts or by some sort of clamping mechanism, for example a hydraulic mechanism. Alternatively the external surfaces of the die parts can slide on inclined planes into a separate housing means which enables the mould to withstand lateral forces. It is important that good seals are achieved when high applied and holding pressures are being used.

Typically, the mould has a "gate", this being the opening in the mould through which detergent composition may be delivered to the mould cavity. In this respect, the gate opens on one side to the mould cavity and on the other side may be engaged directly or indirectly to the pressure applying means.

The detergent composition may be delivered from the pressure applying means via a runner (or sprue) channel. In this respect, it may be beneficial to heat or cool the runner channel. The detergent composition may be delivered to the mould cavity directly without any runner channel. For example, it may be delivered directly through a nozzle.

The mould may comprise a "neck", a short channel separated from the mould cavity by the gate. The detergent composition may be delivered through the mould neck. Alternatively, a nozzle may enter the mould cavity via the neck and gate in order to deliver the detergent composition.

In a mould comprising die parts, the gate and/or a neck may be totally present in one die part or may be formed on the engagement of two or more die parts. The gate opens on one side to the cavity and on the other side is adapted to be engaged, suitably by means of a nozzle entering the mould via a neck, to the pressure applying means.

The mould may be of such a design that it can be closed once it is full or once the material in the mould has solidified to the extent that an outer shell has formed. By making the mould air tight, shrinkage effects are controlled. In a preferred embodiment, the gate remains open whilst a pressure continues to be applied by the pressure applying means. The mould may be closed at the gate whilst the material inside the mould is still under pressure.

The process may be carried out in a continuous manner by having a plurality of moulds circulating through a feed station where the detergent composition is injected under pressure in to each mould and subsequently taken through the steps of cooling to solidify the material further and demoulding before being recycled again.

In a mould comprising die parts, the die parts may be designed so there is a differential level of adherence of the solidified detergent bars. This allows flexibility in the methods of release of the bars from the moulds as the dies are split. Differential adherence of the solidified bars to the dies may be achieved, for example, by coating certain die parts as described above and not others, or by using coatings with different release characteristics.

Venting

In injection moulding processes it is generally necessary to provide a means for venting, i.e. removal of air from the mould, as the mould is filled. Mould venting is a technique employed in various known injection moulding processes, for example in the thermoplastics industry, and such techniques may also be suitably employed in the present invention as would be understood by the man skilled in the art.

In the present invention, mould venting may be achieved by simply providing a venting means such as, for example, a small hole(s) or a slit(s) in the mould. The vent may be formed by two or more die parts of the mould coming together.

Alternatively, the vent may be an integral part of a mould or die. The vent may be closed by the detergent composition filling the mould being solidified at that point. Alternatively, a small amount of detergent material may exit the mould through the vent, this material being subsequently removed. It is also possible to have a venting means which can be opened and closed, being open during mould filling and closed once the mould has been filled. It is also possible to facilitate air flow from the mould by adopting suitable shapes for the mould and logo.

The present invention also provides for venting by means of incorporating a porous material into the mould. Porous material herein includes any material that is porous or permeable and which has pores within the range of from 2 to 500 microns in diameter. Preferably, the pores are in the range of from 5 to 50 microns, especially from 10 to 20 microns.

The porous material may constitute a part or all of the mould or die part. For example, it may be that just the logo comprises porous material. Moulds comprising porous material can be used for forming bars from detergent compositions delivered in molten and non-molten states.

Suitable porous material for use in the moulds as a venting means is Metapor F100 AL, a microporous, air permeable, aluminum available from Portec, North America, a division of NEST Technologies or from Portec, Ltd. a Swiss company. Another porous die material may be Porcerax II, a porous steel available from Mold Steel, Inc., of Erlanger, Ky., USA. Bar release can also be facilitated by pressurising, for example, a porous die after the mould has been filled and the detergent composition solidified to an appropriate degree.

In a further embodiment, the present invention provides for air present in the mould to be removed by vacuum or partial vacuum during, or more preferably, prior to filling.

In a preferred embodiment of the present invention, the nozzle is adapted with means to allow air to escape from the mould as the nozzle delivers material to the mould. Preferred means are channels running parallel to the nozzle's length. Such channels suitably extend most of the length of the nozzle, although preferably they do not extend to the very tip of the nozzle. When the nozzle is delivering detergent composition within the mould cavity, air can flow along these channels out of the mould. In a preferred embodiment, the nozzle is withdrawn from the mould cavity as the cavity fills. When the nozzle reaches the point where it is substantially flush with the gate of the mould, the unchannelled portion of the nozzle tip provides an effective air seal. This allows a holding pressure to be applied as required.

Bar formulations

Suitable detergent compositions for injection moulding include the following ingredients:

(A) 10–60% by weight of a synthetic, non-soap detergent (B) 0–60% by weight of a water soluble structurant which has a melting point in the range 40–100° C., (C) 5–60% by weight of a water insoluble structurant which has a melting point in the range 40–100° C., (D) 1–25% by weight water, (E) 1–20% by weight total composition one or more amphoteric and/or zwitterionic surfactants, (F) 0–20% by weight total composition one or more nonionic surfactants, (G) 0–60% by weight soap, (H) Other optional ingredients as described below, (I) 0–10% by weight total electrolyte.

Suitable synthetic detergents for use in the process of the present invention include anionic surfactants such as $C_8$–$C_{22}$ aliphatic sulphonates, aromatic sulphonates (e.g. alkyl benzene sulphonate), alkyl sulphates (e.g. $C_{12}$–$C_{18}$ alkyl sulphates), alkyl ether sulphates (e.g. alkyl glyceryl ether sulphates).

Suitable aliphatic sulphonates include, for example, primary alkane sulphonate, primary alkane disulphonate, alkene sulphonate, hydroxyalkane sulphonate or alkyl glyceryl ether sulphonate (AGS).

Other anionic surfactants that can also be used include alkyl sulphosuccinates (including mono- and dialkyl, e.g. $C_6$–$C_{22}$ sulphosuccinates), alkyl and acyl taurates, alkyl and acyl sarcosinates, sulphoacetates, alkyl phosphates, alkyl phosphate esters, alkoxyl alkyl phosphate esters, acyl lactates, monoalkyl succinates and maleates, sulphoacetates.

Another surfactant which may be used are the acyl isethionates (e.g. $C_8$–$C_{18}$). These esters are prepared by reaction between alkali metal isethionate with mixed aliphatic fatty acids having from 6 to 18 carbon atoms and an iodine value of less than 20. At least 75% of the mixed fatty acids have from 12 to 18 carbon atoms and up to 25% have from 6 to 10 carbon atoms. The acyl isethionate may be an alkoxylated isethionate such as is described in Ilardi et al., U.S. Pat. No. 5,393,466, hereby incorporated by reference into the subject application.

The anionic surfactants used are preferably mild, i.e. a surfactant which does not damage the stratum corneum, the outer layer of the skin. Harsh surfactants such as primary alkane sulphonate or alkyl benzene sulphonate will generally be avoided.

Suitable water soluble structurants include moderately high molecular weight polyalkylene oxides of appropriate melting point (e.g., 40 to 100° C., preferably 50 to 90° C.) and in particular polyethylene glycols or mixtures therefore. Polyethylene glycols (PEG's) which are used may have a molecular weight in the range 2,000 to 25,000. Also included are water soluble starches.

Suitable insoluble structurants are generally an unsaturated and/or branched long chain ($C_8$–$C_{24}$) liquid fatty acid or ester derivative thereof; and/or unsaturated and/or branched long chain liquid alcohol or ether derivatives thereof. It may also be a short chain saturated fatty acid such as capric acid or caprylic acid. Examples of liquid fatty acids which may be used are oleic acid, isostearic acid, linoleic acid, linolenic acid, ricinoleic acid, elaidic acid, arichidonic acid, myristoleic acid and palmitoleic acid. Ester derivatives include propylene glycol isostearate, propylene glycol oleate, glyceryl isostearate, glyceryl oleate and polyglyceryl diisostearate.

Examples of alcohols include oleyl alcohol and isostearyl alcohol. Examples of ether derivatives include isosteareth or oleth carboxylic acid; or isosteareth or oleth alcohol. Zwitterionic surfactants suitable for use in formulations are exemplified by those which can be broadly described as derivatives of aliphatic quaternary ammonium, phosphonium, and sulphonium compounds, in which the aliphatic radicals can be straight or branched chain, and wherein one of the aliphatic substituents contains from about 8 to about 18 carbon atoms and one contains an anionic group, e.g. carboxy, sulphonate, sulphate, phosphate, or phosphonate.

Amphoteric detergents which may be used in this invention include at least one acid group. This may be a carboxylic or a sulphonic acid group. They include quaternary nitrogen and therefore are quaternary amido acids. They should generally include an alkyl or alkenyl group of 7 to 18 carbon atoms. Suitable amphoteric detergents include simple betaines or sulphobetaines.

Amphoacetates and diamphoacetates are also intended to be covered in possible zwitterionic and/or amphoteric compounds which may be used.

In addition to one or more anionic and amphoteric and/or zwitterionic, the surfactant system may optionally comprise a nonionic surfactant at a level of up to 20% by weight.

The nonionic which may be used includes in particular the reaction products of compounds having a hydrophobic group and a reactive hydrogen atom, for example aliphatic alcohols, acids, amides or alkyl phenols with alkylene oxides, especially ethylene oxide either alone or with propylene oxide. Specific nonionic detergent compounds are alkyl ($C_6$–$C_{22}$) phenols-ethylene oxide condensates, the condensation products of aliphatic ($C_8$–$C_{18}$) primary or secondary linear or branched alcohols with ethylene oxide, and products made by condensation of ethylene oxide with the reaction products of propylene oxide and ethylenediamine. Other so-called nonionic detergent compounds include long chain tertiary amine oxides, long chain tertiary phosphine oxides and dialkyl sulphoxides.

The nonionic may also be a sugar amide, such as a polysaccharide amide. Specifically, the surfactant may be one of the lactobionamides described in U.S. Pat. No. 5,389,279 to Au et al. which is hereby incorporated by reference or it may be one of the sugar amides described in U.S. Pat. No. 5,009,814 to Kelkenberg, hereby incorporated into the subject application by reference.

Other surfactants which may be used are described in U.S. Pat. No. 3,723,325 to Parran Jr. and alkyl polysaccharide nonionic surfactants as disclosed in U.S. Pat. No. 4,565,647 to Llenado, both of which are also incorporated into the subject application by reference.

The nonionic surfactant can also be a water soluble polymer chemically modified with hydrophobic moiety or moieties. For example, EO-PO block copolymer, hydrophobically modified PEG such as POE(200)-glyceryl-stearate can be included in the formulations claimed by the subject invention. Formulations can furthermore optionally contain up to 60% soap made by normal soap making procedures. For example, the products of saponification of natural material such as tallow, coconut oil, palm oil, rice bran oil, fish oil or any other suitable source of long chain fatty acids may be used. The soap may be neat soap or middle phase soap.

In addition, the compositions of the invention may include optional ingredients as follows:

Organic solvents, such as ethanol or propylene glycol; auxiliary thickeners, such as carboxymethylcellulose, magnesium aluminum silicate, hydroxyethylcellulose, methylcellulose, carbopols, glucamides, or Antil from Rhone Poulenc; perfumes; sequestering agents, such as tetrasodium ethylenediaminetetraacetate (EDTA), EHDP or mixtures in an amount of 0.01 to 1%, preferably 0.01 to 0.05%; and coloring agents, opacifiers and pearlizers such as zinc stearate, magnesium stearate, $TiO_2$, EGMS (ethylene glycol monostearate) or Lytron 621 (Styrene/Acrylate copolymer); all of which are useful in enhancing the appearance or cosmetic properties of the product.

The compositions may further comprise antimicrobials such as 2-hydroxy-4,2'4' trichlorodiphenylether (DP300); preservatives such as dimethyloldimethylhydantoin (Glydant XL1000), parabens, sorbic acid etc.

The compositions may also comprise coconut acyl mono- or diethanol amides as suds boosters, and strongly ionizing salts such as sodium chloride and sodium sulphate may also be used to advantage. Such electrolyte is preferably present and level between 0 and 5% by weight, preferably less than 4% by weight.

Antioxidants such as, for example, butylated hydroxytoluene (BHT) may be used advantageously in amounts of about 0.01% or higher if appropriate.

Cationic conditioners which may be used include Quatrisoft LM-200 Polyquaternium-24, Merquat Plus 3330 - Polyquaternium 39; and Jaguar type conditioners.

Polyethylene glycols which may be used include Polyox WSR-205 PEG 14M, Polyox WSR-N-60K PEG 45M, Polyox WSR-N-750 PEG 7M and PEG with molecular weight ranging from 300 to 10,000 Dalton, such as those marketed under the tradename of CARBOWAX SENTRY by Union Carbide.

Thickeners which may be used include Amerchol Polymer HM 1500 (Nonoxynyl Hydroethyl Cellulose); Glucam DOE 120 (PEG 120 Methyl Glucose Dioleate); Rewoderm $^{(R)}$ (PEG modified glyceryl cocoate, palmate or tallowate) from Rewo Chemicals; Antil$^{(R)}$ 141 (from Goldschmidt). Clays and paraffin wax.

Another optional ingredient which may be added are the deflocculating polymers such as are taught in U.S. Pat. No. 5,147,576 to Montague, hereby incorporated by reference.

Another ingredient which may be included are exfoliants such as polyoxyethylene beads, walnut shells and apricot seeds. The detergent compositions of the present invention may include typical known additives such as perfumes and colourants.

Additives and benefit agents

For improving the consumer-perceived properties of the bars, it may be desirable to incorporate benefit agents and/or other additives into the formulation. Skin benefit agents are defined as products which may be included in a detergent composition which will be deposited onto the skin when the detergent composition is applied to the skin and which will impart or maintain desirable properties for the skin.

It is particularly preferred that the detergent compositions used in the present invention comprise benefit agents such as, for example, moisturising components.

Typically, such benefit ingredients are substantially immiscible with the detergent composition and are desired to be present in the form of discrete zones. When the detergent composition is in a fluid state as in a casting process, any density differences between the benefit ingredients and the fluid detergent mixture can lead to phase separation in the unstirred system such as would exist in a mould after casting. The benefit agent may exist as a single component phase or with some of the ingredients of the formulation.

One of the problems associated with benefit agents is that they are washed away by the lathering surfactants before they are deposited on the skin. One way to avoid this is to disperse benefit agents heterogeneously in the bar, e.g. as zones, allowing direct transfer of the benefit agent as the bar is rubbed on the skin. It is widely accepted that more benefit agent deposits on the skin when the benefit agent is dispersed heterogeneously.

Further, in order to give optimum deposition to the skin during the wash process, it may be desirable to control the size of the zones occupied by the benefit ingredient in the finished bar product. In a fluid system, it is difficult to stabilise droplets of a specific size.

Such zones may be of size 1 micron to 5 mm. Preferably, the zones are of size 15 to 500 microns for example as set out in WO 96/02229. More preferably, the zones are of size in the range 50 to 200 microns.

The inventors have found that the process of the invention is particularly suitable for the incorporation of benefit agents to the detergent mixture, and in particular when the detergent mixture is in a semi-solid state. Preferably, benefit agent is added to the detergent composition in the means for feeding the detergent composition. Where the means for feeding the detergent composition comprises a screw feed, the benefit agent may be added at any suitable position along the screw feed. Using the equipment of the present invention, where a temperature profile exists in the equipment, it is possible to choose the temperature at which the benefit agent is added. It is therefore possible to introduce the benefit ingredient into a bulk flow of chosen viscosity. By using appropriate equipment and processing parameters, it is also possible to introduce the benefit agent into a bulk flow of material which has a chosen level of mixing and structuring.

It is also possible to control the shear (mixing) experienced by the materials after they have been combined, which can be used to manipulate the size of the benefit agent zones. The inventors have found that the benefit agent added by the process of the present invention can appear in the final detergent composition bar in non-spherical domains. In general, the domains are found to be elongate.

The bars produced containing substances, such as for example benefit agents, which are substantially immiscible with the detergent composition will essentially be two-phase systems. One phase may simply comprise the benefit agent, whilst the other phase comprises the detergent composition. Alternatively, the benefit agent may interact with one or more components of the detergent composition to form a separate benefit agent-containing phase.

Accordingly, in another aspect, the present invention provides a detergent bar obtainable by the process of the present invention, comprising detergent composition and components immiscible with the detergent compositions such as benefit agent, wherein the immiscible component is present in non-spherical domains. Other ingredients such as perfume or colourants may be introduced in the same way.

Benefit agents include components which moisturise, condition or protect the skin. Suitable benefit agents include moisturising components, such as, for example, emollient/oils. By emollient oil is meant a substance that softens the skin and keeps it soft by retarding the decrease of its water content and/or protects the skin.

Preferred benefit agents include:

Silicone oils, gums and modifications thereof such as linear and cyclic polydimethylsiloxanes; amino, alkyl, alkylaryl and aryl silicone oils. The silicone oil used may have a viscosity in the range 1 to 100,000 centistokes.

Fats and oils including natural fats and oils such as jojoba, soyabean, rice bran, avocado, almond, olive, sesame, persic, castor, coconut, mink, arachis, corn, cotton seed, palm kernel, rapeseed, safflower seed and sunflower oils; cocoa butter, beef tallow, lard; hardened oils obtained by hydrogenating the aforementioned oils; and synthetic mono, di and triglycerides such as myristic acid glyceride and 2-ethylhexanoic acid glyceride;

Waxes such as carnauba, spermaceti, beeswax, lanolion and derivatives thereof;

Hydrophobic plant extracts;

Hydrocarbons such as liquid paraffins, petrolatum, microcrystalline wax, ceresin, squalene and mineral oil;

Higher alcohols and fatty acids such as behenic, palmitic and stearic acids; lauryl, cetyl, stearyl, oleyl, behenyl, cholesterol and 2-hexadecanol alcohols;

Esters such as cetyl octanoate, cetyl lactate, myristyl lactate, cetyl palmitate, butyl myristate, butyl stearate, decyl oleate, cholesterol isostearate, myristyl myristate, glyceryl laurate, glyceryl ricinoleate, glyceryl stearate, alkyl lactate, alkyl citrate, alkyl tartrate, glyceryl isostearate, hexyl laurate, isobutyl palmitate, isocetyl stearate, isopropyl isostearate, isopropyl laurate, isopropyl linoleate, isopropyl myristate, isopropyl palmitate, isopropyl stearate, isopropyl adipate, propylene glycol monolaurate, propylene glycol ricinoleate, propylene glycol stearate, and propylene glycol isostearate;

Essential oils such as fish oils, mentha, jasmine, camphor, white cedar, bitter orange peel, ryu, turpentine, cinnamon, bergamont, citrus unshiu, calamus, pine, lavender, bay, clove, hiba, eucalyptus, lemon, starflower, thyme, peppermint, rose, sage, menthol, cineole, eugeniol, citral, citronelle, borneol, linalool, geraniol, evening primrose, camphor, thymol, spirantol, pinene, limonene and terpenoid oils;

Lipids such as cholesterol, ceramides, sucrose esters and pseudo-ceramides as described in EP-A-556 957;

Vitamins such as vitamin A and E, and vitamin alkyl esters, including those vitamin C alkyl esters;

Suncreens such as octyl methoxyl cinnamate (Parsol MCX) and butyl methoxy benoylmethane ) Parsol 1789);

Phospholipids; and Mixtures of any of the foregoing components.

It should be understood that where the emollient may also function as a structurant, it should not be doubly included such that, for example, if the structurant is 15% oleyl alcohol, no more than 5% oleyl alcohol as "emollient" would be added since the emollient (whether functioning as emollient or structurant) should not comprise more than 20%, preferably no more than 15% by weight of the composition.

The emollient/oil is generally used in an amount from about 1 to 20%, preferably 1 to 15% by weight of the composition. Generally, it should comprise no more than 20% by weight of the composition.

The present invention will be further described by way of the accompanying drawings.

DETAILED DESCRIPTION OF DRAWINGS

Figure 1:
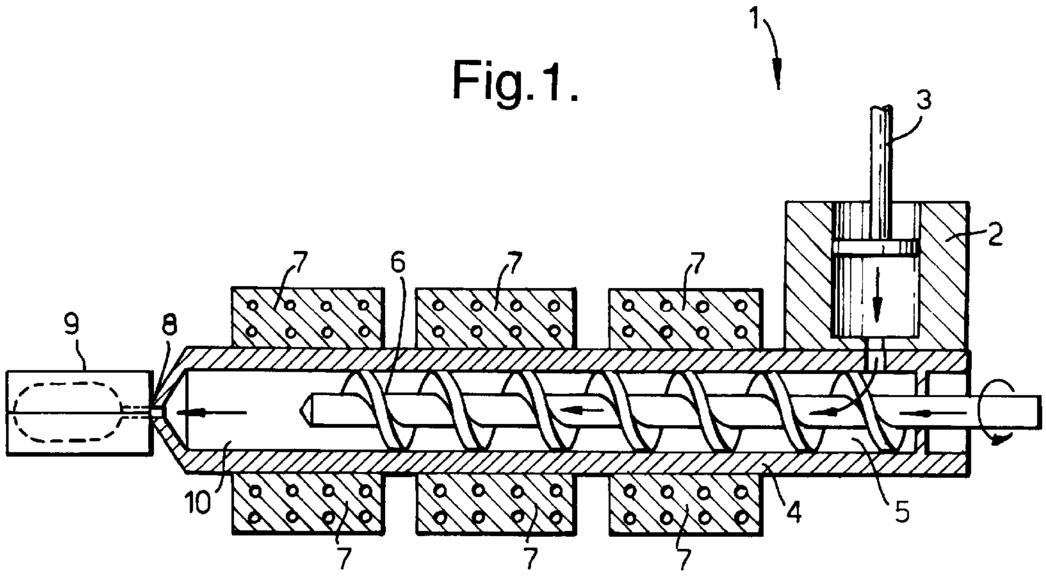
FIG. 1 shows apparatus for use in the method of the invention (side view, reciprocating single screw extruder).

FIG. 1 shows an injection moulding apparatus for detergent material for use in the present invention, generally designated (1) ('Sandretto' Series 7 HP 135 injection moulder).

The apparatus comprises conventional means (2) for feeding particulate solid detergent composition. The means shown is generally known as a stuffing pot and comprises a piston (3) bearing upon a loose mass of particulate detergent material. The particulate material flows from the stuffing pot to a screw feed apparatus. The screw feed apparatus comprises a barrel (4) having a cylindrical inner bore (5). Inside the barrel (4) is a single screw (6) (50 mm diameter dough moulding compound screw). Means (not shown) are provided for rotating the screw (6) continuously. The screw is rotated at a speed of 80 to 100 rpm. The rotation of the screw (6) causes the detergent composition to flow in the direction shown by the solid-headed arrows. Independently controllable heating means in the form of ducts for liquid (7) are provided surrounding the barrel (4). The heating means (7) raise the temperature of the detergent composition to a level at which it can be delivered under pressure without becoming sticky. The temperature profile along the barrel (4) is stepped.

At the far end of the barrel (4) the bore (5) reduces in diameter to a nozzle (8), to which a two-part aluminium mould (9) having a mould cavity configured in the form of a detergent bar can be clamped (clamping means not shown.)

During operation, the screw (6) can move within the barrel (4), to leave an accumulation zone (10) in the cylindrical bore (5) at the end thereof.

In operation, detergent composition can be prepared as small particles (average diameter in the region 1 to 10 mm) by using equipment already known in the art, such as chill rolls, plodders with noodler plates etc. The particulate detergent composition is fed into the stuffing pot (2) whereby it is fed into the screw feed. The screw (6) is continuously rotated to transport the detergent material along the bore (5). During transportation, the temperature of the detergent material is raised by the heating means (7), so that, at the point of injection, it is between ambient and 70° C.

Means (not shown) are provided for moving the feed screw (6) along the axis of the cylindrical bore (5).

During operation, flowable detergent composition at elevated temperature is fed into a zone (10). As the detergent composition accumulates in this zone it forces the screw (6) away from the nozzle (8) so that the volume of the space (10) increases.

When a sufficient volume has been accumulated in the space (10), the screw (6) is driven by hydraulic means (not shown) towards the nozzle (8), whereby pressure is applied to the detergent composition at elevated temperature so that it is delivered through the nozzle into the mould (9). A check valve (not shown) is provided to prevent back flow along the screw.

Once the mould is full, pressure may be maintained on the mould as it cools if required. This allows the volume of detergent in the mould to be maintained as it shrinks on cooling.

The mould may then be removed from the unit and cooled if necessary before opening.

Mould cooling means may be used to accelerate the cooling of the detergent composition in the mould. For example, solid carbon dioxide, ice/water bath or cold water may be used to pre-cool the moulds or post-cool the moulds before de-moulding.

Figure 2:
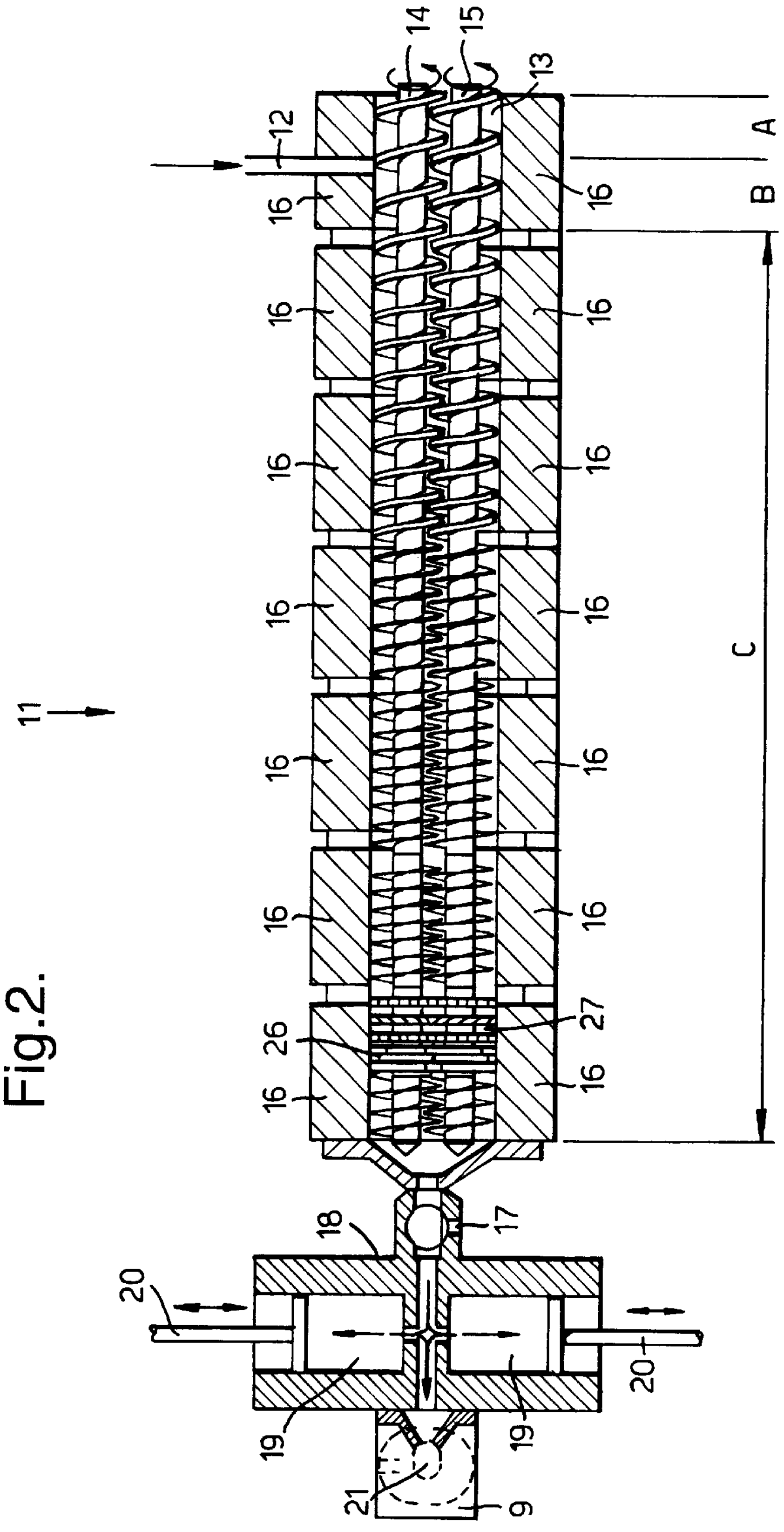
FIG. 2 shows a further apparatus according to the present invention (plan view, twin-screw extruder).

FIG. 2 shows a side view of an embodiment of the present invention. It is generally designated (11). The apparatus (11) is preferably for feeding detergent composition which is supplied in liquid form. However, the apparatus (11) could be used to feed detergent compositions supplied in solid form if provided with suitable feed means.

A duct 12 is provided for receiving a feed of liquid detergent composition, from a separate step in the manufacturing process, for example. The duct (12) is connected to an extruder (13). In the extruder (13) there are two intermeshing, co-rotating feed screws (14), (15) each with a single flight. At the end of the screws, a set of medium shear mixing elements is provided, comprising three tri-lobe paddles (26) and three 'melting discs' (27) to provide back pressure and some mixing. Temperature control means are provided in jacketed zones (16) around the barrel of the extruder (13). The temperature control means comprise channels for liquid coolant, and electrical units for heating. Temperature control means in zone A of the extruder are maintained at a low temperature, e.g. 30° C., to encourage the formation of solid detergent composition to seal the end of the shafts of the screws (14),(15). The temperature control means in the zone marked B are at high temperature to maintain the detergent composition in molten state to prevent blockages at the feed point. The temperature control means (16) in the region marked C (i.e. the remainder of the extruder length) are for conditioning the detergent composition gradually to the desired temperature.

A valve connection (17) is provided through which detergent composition is fed to an injection head (18) comprising two injection chambers (19). The injection chambers (19) comprise cylinders with retractable pistons (20). The injection head (18) has a nozzle (21) which will be described in relation to FIG. 4 below. The connection (17), injection head (18) and injecting chambers (19) are all provided with electrical heaters (not shown)for temperature control.

In operation, a molten feed of detergent composition at a temperature in the region 90 to 95° C. is fed into the feed cavity 13 and driven by the co-rotating screws in the direction of the solid-headed arrow through the connection (17) to the injection chambers (19). At this point the temperature is below 70° C. During the first phase of operation, detergent material is accumulated in the injection chambers, the pistons (20) being simultaneously displaced. When a suitable volume of detergent composition has been accumulated, the pistons (20) are actuated by hydraulic pressure (not shown) whereby pressure is applied to the detergent composition which is forced through the nozzle (21) to a mould which will be described further below.

Figure 3:
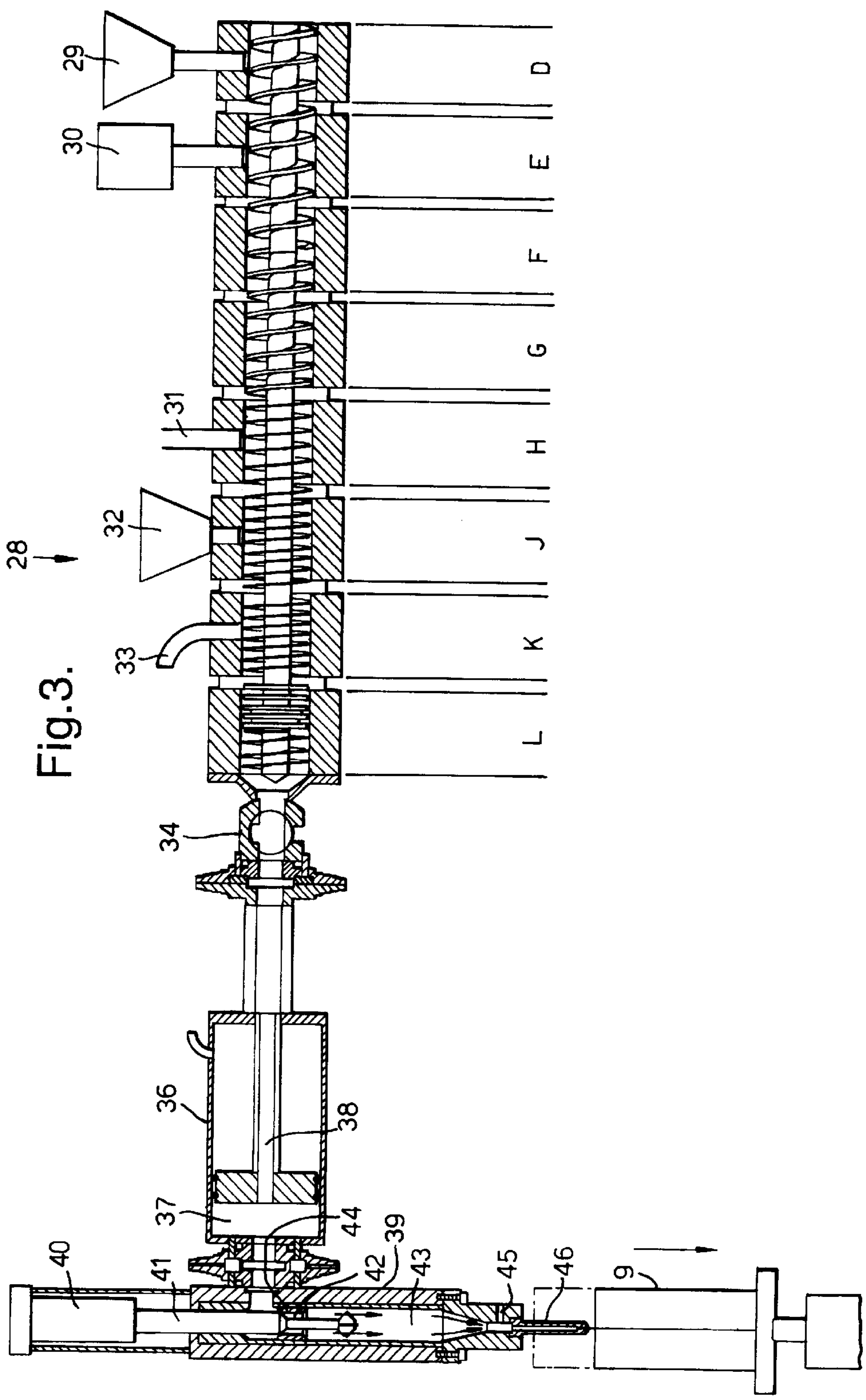
FIG. 3 shows a further apparatus according to the present invention (side view, twin-screw extruder with in-line low shear injection head, degassing zones and solid-feed stuffer).

FIG. 3 shows a side view of an embodiment of the present invention. It is generally designated (28). The apparatus comprises an extruder, with two intermeshing, co-rotating feed screws, each with a single flight as described in FIG. The general configuration of the two intermeshing screws can be chosen to suit the particular application. At the end of the screws, a set of medium shear mixing and kneading elements is provided also as described in FIG. 2. The mixing and kneading elements can be interspersed between conveying screw elements of various pitch. Temperature control means, comprising channels for liquid coolant and electrical heating means, are provided by jacketed zones around the barrel of the extruder (as in FIG. 2).

The apparatus can accept liquid, semi-solid or solid materials as feed, depending on the feeding arrangement chosen. Particulate detergent material is fed into zone D of the extruder via a solid feeder (29). Fluid materials are fed into zone E of the extruder by a liquid feeding means (30). A degassing port (31) is illustrated in zone H of the extruder. At zone J of the extruder, a solid feeding means (32) for delivering solid adjuncts to the extruder is illustrated. At zone K, a duct (33) is shown for the introduction of liquid additives by a pump (not shown). Since the extruder zones can be interchanged, it should be understood that solids, liquids, and additive feeds may be introduced at any position along the length of the screw. One or a number of feeds may be supplied for a particular product.

At the exit of the extruder, is a three-way valve (34) used for sampling and recycle. When this valve is in the straight-through position, conditioned material from the extruder passes into an accumulator (36) comprising a cylindrical chamber (37) and a piston (38). The position of the piston (38) in the cylinder (37) varies according to the flow of material into and out of the accumulator. A pneumatic pressure behind the piston keeps material in the accumulator at constant pressure and thus provides a buffer between the continuous flow from the extruder and the intermittent demands of the injection head (39). The three-way valve (34) and accumulator (36) are provided with temperature-controlled jackets.

The injection head is positioned perpendicular to the extruder, with its axis vertical. It is provided with a means for temperature control (not shown).

The injection head (39) comprises a hydraulic actuator (40), a spindle (41) connected to the actuator, an inlet chamber (42), an injection chamber (43), a non-return ring check valve (44) and an injection valve (45). Also shown is the nozzle (46) and the mould (9). The nozzle and mould can be pre-heated before injection if required.

In charging mode, the injection valve (45) is closed. The pressure above the ring check valve is greater than that below, and the valve moves to its lower seat. In this position material can flow through the ring check valve, between the injection spindle and the cylinder wall. As the injection spindle is moved hydraulically upwards by the movement of the actuator, prepared material flows into the injection chamber. The charging process is complete when the spindle is fully up.

The spindle diameter is minimised (within constraints of mechanical strength) to give maximum area for flow, and therefore exert minimal elongational shear on the flowing material.

When the pressure below the valve exceeds that above, the valve moves to its upper seat and isolates the injection chamber from the inlet chamber. At this point the machine is charged for injection. This passive valve system removes the need for an inlet control valve, and provides for first-in first-out material flow to the mould.

In injection mode, the injection valve (45) is opened, the cylinder is hydraulically driven downwards and the pressure in the injection chamber rises to above that in the inlet chamber. This closes the ring check valve. As the spindle moves downwards with the actuator, material flows from the injection chamber through the open injection valve and into the mould via the nozzle (46).

The volume of material delivered to the mould is determined by the stroke of the hydraulic actuator. The velocity of the material as it is delivered to the mould is determined by the hydraulic pressure.

The applied pressure is measured at an appropriate position within the injection head (39). When using apparatus according to FIG. 3, the applied pressure was measured through the actuator. Furthermore, the pressure at a point just prior to nozzle was also measured. This is recorded as the "injection pressure" as referred to in Tables 3 to 5.

Figure 4:
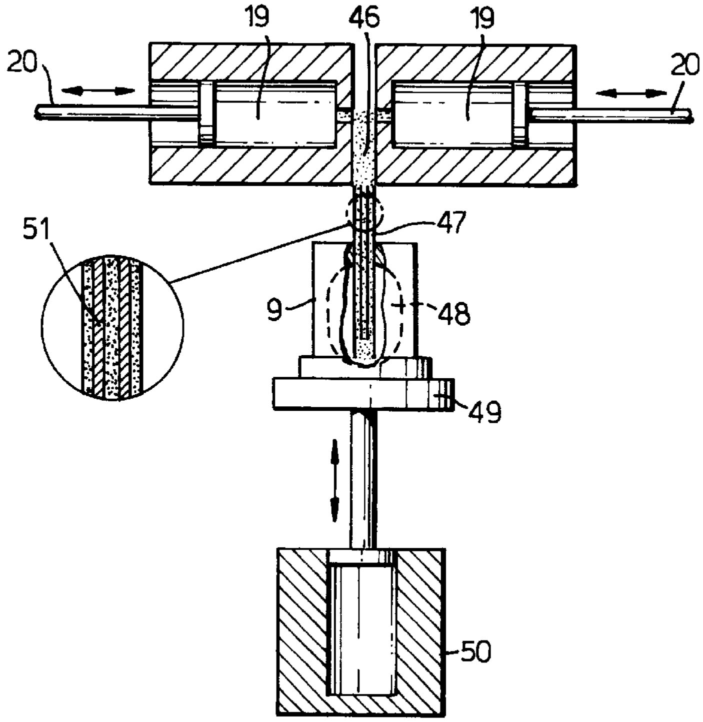
FIG. 4 shows a view from the end of the apparatus of FIG. 2 (apparatus for moving mould during fill).

FIG. 4 shows an end view of the apparatus of FIG. 2. However, the nozzle and mould configuration is equally applicable to the apparatus of FIG. 3. The nozzle (46) can be seen at the top, together with the injection chambers (19) and pistons (20).

Also visible is the mould (9). A nozzle extension (47) extends to the mould cavity (48) of the mould (9) through a hole in the top. The mould (9) is mounted on a plate (49) which is movable up and down by a hydraulic system (50) or manually.

In use, when the pistons (20) are activated to deliver detergent composition under pressure from the injection cylinders, detergent composition flows through the nozzle (46) and nozzle extension (47) into the mould cavity (48). The rate of advance of the pistons (20) is linked to the rate of retraction of the plate (49). As a result, the mould (9) drops as the mould cavity (48) is filled with detergent composition. The detergent composition flowing under pressure tends to fill the bottom of the mould cavity. The rate of retraction of the plate (49) is adjusted so that the tip of the nozzle extension (47) is always just below the surface of the detergent composition in the mould cavity (48). This gives good fill quality.

Alternatively, equally good fill quality is obtained by moving the nozzle (46) instead of the plate (49). The nozzle is moved to the base of the mould cavity (48) and raised out of the mould as the mould cavity is filled with detergent composition.

In a preferred embodiment, the nozzle is fluted by providing it with a series of vertical grooves (51) of depth about 1 mm. These extend from the top of the nozzle to about 10 mm from the tip. When the nozzle is within the mould, air can leave the mould via the flutes. When the nozzle is withdrawn, the mould is sealed by the nozzle, allowing pressure within the mould to be maintained.

Figure 5:
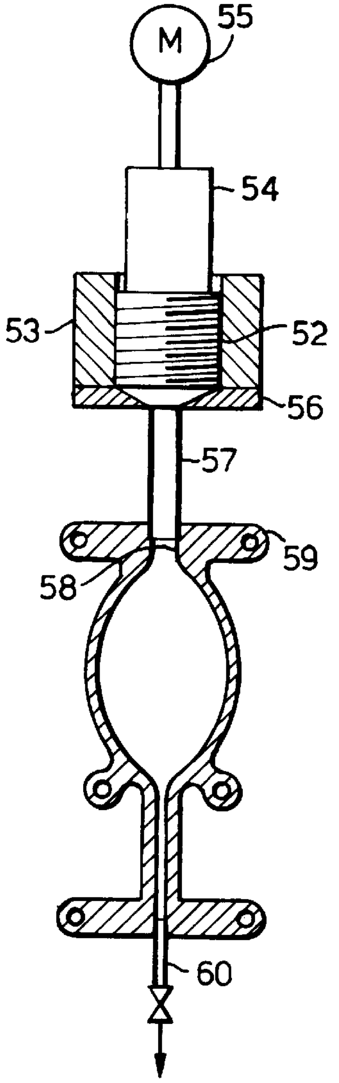
FIG. 5 shows apparatus for use in the method of the invention (plan view, simple ram extruder).

FIG. 5 shows a simple ram extruder apparatus for use in the method of the invention. A sample reservoir or barrel (52) has a facility for heating (53) and maintaining the temperature of the sample ranging from room temperature (RT) to 100° C. A plunger (54) is provided along with a drive mechanism and a speed controller (55). A pressure indicator-transmitter (56) is provided at the bottom of the reservoir.

One end of a runner (57) is screwed on to the bottom of the reservoir. The other end of the runner is connected to a gate (58) on the mould (59) using threaded bolts. A vacuum pump is connected to the exit capillary (60) to evacuate the mould prior to filling.

Figure 6:
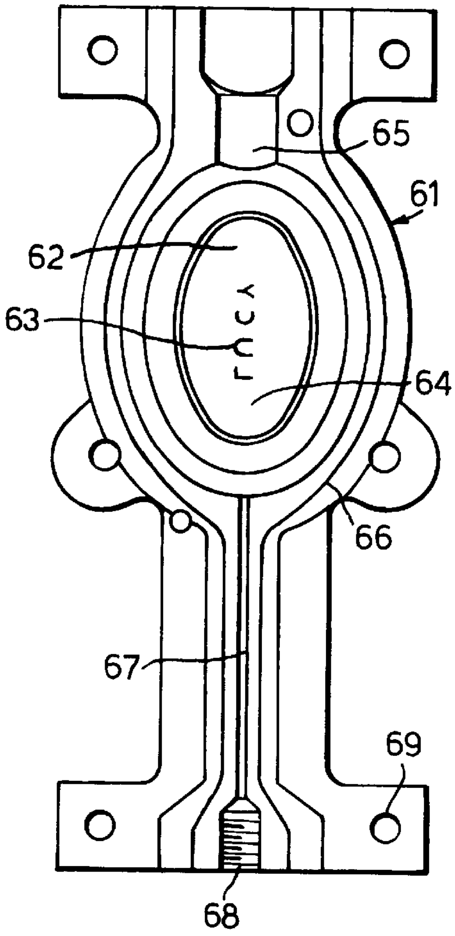
FIG. 6 shows the internal construction of a mould die according to the invention.

FIG. 6 shows a die (61) of the mould manufactured from aluminium. The die is provided with a cavity (62) of volume about 60 ml. The inside surface of the cavity is convex and is provided with projections providing a mirror-image of the inscription (63) desired on the surface of the injection moulded bar. The inside surface of the cavity is coated with PTFE, 35 micron in thickness (64). When two dies are joined the cavity formed, corresponding to the final shape of the injection moulded tablet, is open via a gate (65). This gate connects the feed reservoir through a runner to the cavity. Leakage of material from the mould is prevented by providing a gasket (66) along the joining surfaces of the dies. A capillary of diameter 1.5 mm (67) connects the mould to a vacuum pump. The end of the capillary that is away from the cavity is threaded (68) and connected to a valve, which in turn is connected to a vacuum pump. The closure of the valve helps in attaining high injection pressures inside the mould after evacuation of the mould. The die is provided with holes (69) for bolting the two dies together.

Figure 7:
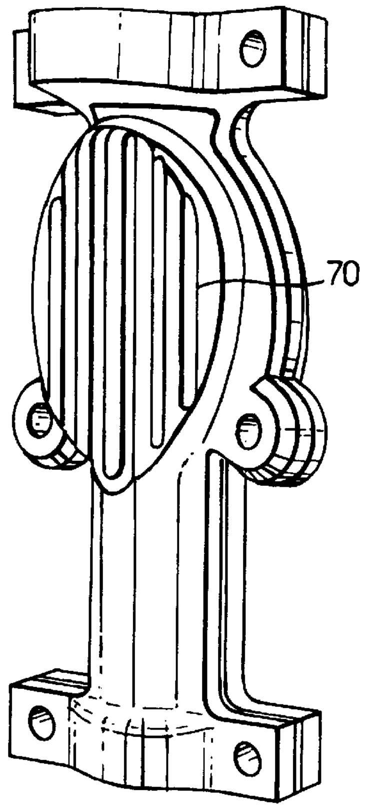
FIG. 7 shows the external construction of a mould.

FIG. 7 shows the external surfaces of a mould comprising two dies as in FIG. 5 joined together. The dies are provided with fins/ribs (70) to enhance the cooling efficiency.

Figure 8:
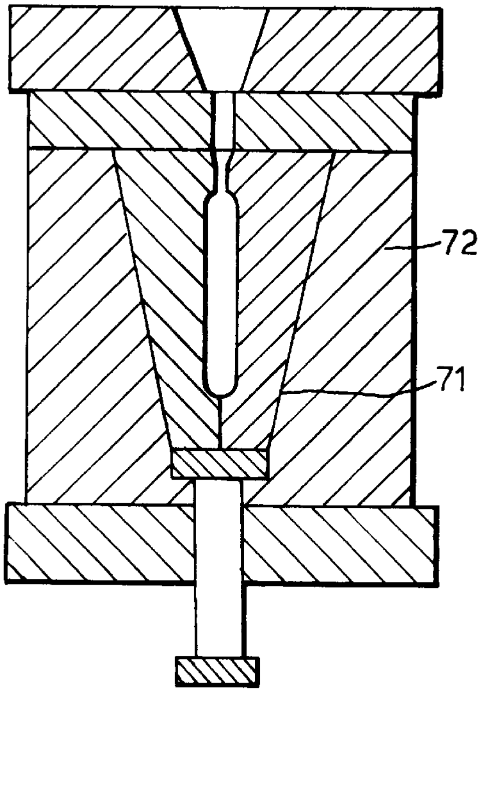
FIG. 8 shows a further embodiment of a mould.

FIG. 8 illustrates the further embodiment of the mould of the invention wherein the external surfaces of the dies (71) are inclined such that the dies of the mould can slide on the internal inclined surfaces of the housing (72) to withstand injection pressures.

Figure 9:
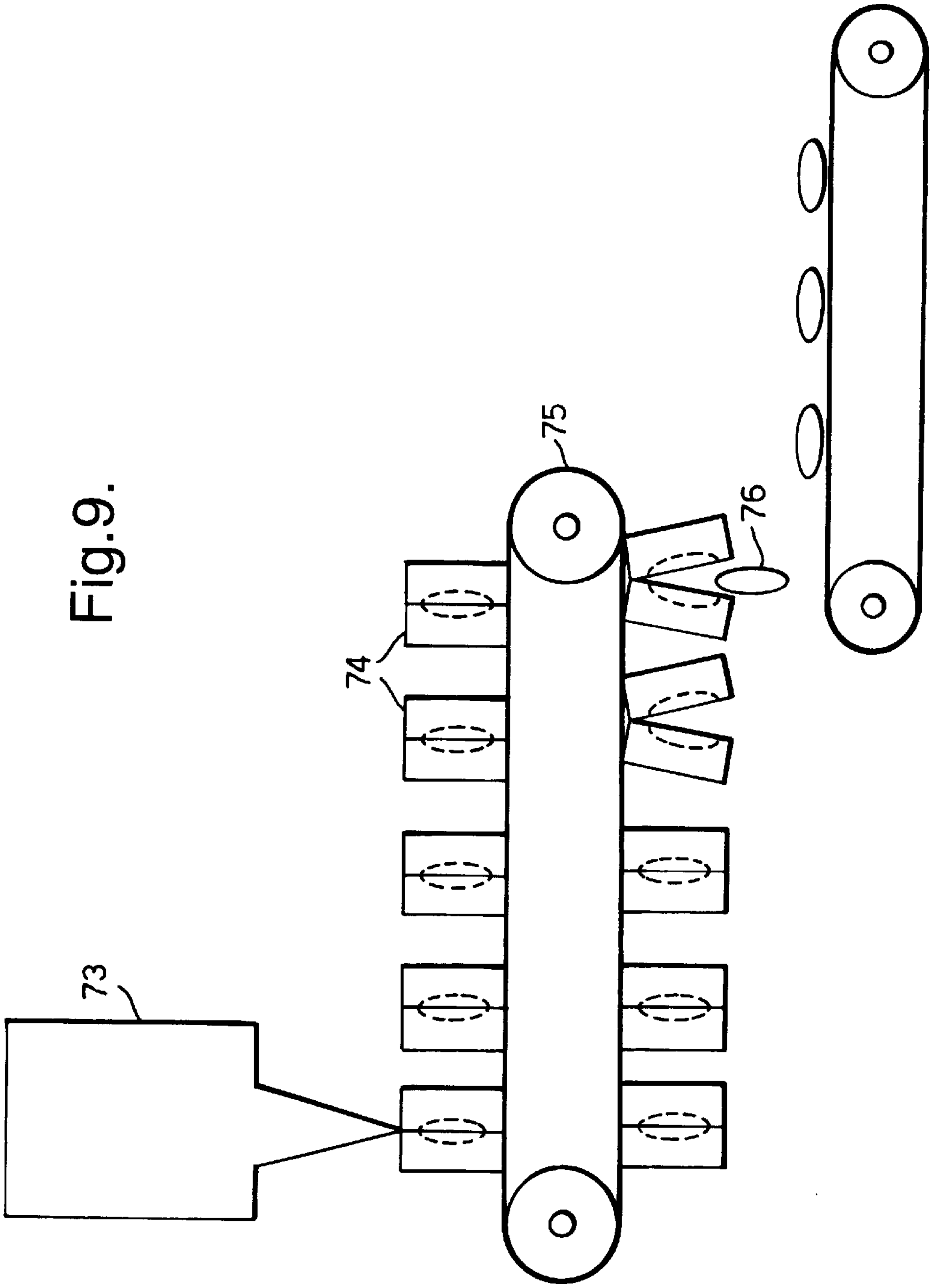
FIG. 9 shows a schematic illustration of a detergent moulding system.

FIG. 9 illustrates the detergent moulding system in accordance with the invention comprising of a feed reservoir (73) and a plurality of the said moulds (74) mounted on conveyor (75) whereby the process of the invention carried out by circulating each said mould through the reservoir where the detergent formulation is injected in to the mould under pressure and subsequently taken through the steps of cooling to complete solidification and demoulding (76) before being recycled again.

The present invention will be further described by way of the following non-limiting examples:

EXAMPLES

Example 1

A reciprocating screw injection moulding unit according to FIG. 1 sold as the "SANDRETTO Series 7 HP135" having three temperature controlled zones was used. The machine was fitted with a 50 mm diameter dough moulding compound screw and barrel. The feed means comprised a conventional stuffing pot, or manual feed as appropriate to the material. A screw rotation rate of 80 to 100 rpm was used.

The mould (9) comprised a pair of aluminium mould parts defining a bar shape. These were as those conventionally used in die stamping of detergent bars, modified by the addition of a feed hole sized to take the nozzle, and small holes at appropriate places in the mould to allow air to vent during filling.

Detergent formulations A, B and C were injection moulded.

| Formulation A was as follows: | wt % active |
|---|---|
| Directly Esterified Fatty Isethionate | 27.00 |
| Palmitic/stearic acid blend | 17.00 |
| Coco amido propyl betaine | 5.00 |
| Maltodextrin | 10.00 |
| Sodium Stearate | 6.00 |
| PEG 8000 | 21.62 |
| PEG 300 | 2.05 |
| PEG 1450 | 4.95 |
| Water | 4.50 |
| Sodium isethionate | 2.16 |
| Minor additives (preservatives,perfume,colour etc) | 1.72 |
| TOTAL | 100.00 |

Formulation B comprised white milled, commercially available UK Lux soap dated September 1996. Formulation C comprised milled commercially available Dove beauty bar dated June 1996.

A detergent composition was fed into the stuffing pot in the form of small particulates (grain size approximately 1 to 10 mm). Such particulate material can be obtained by chopping up commercially available bars or using commercially available chill roll or plodder/noodler equipment. In same experiment, the detergent composition was fed into the unit by hand. The injection moulding apparatus was then used to inject detergent composition into the mould. The detergent compositions were in a semi-solid state when they entered the mould. The moulds were pre-cooled in ice/water and dried before filling. After a few minutes at ambient conditions the moulds were removed from the injection moulder and opened. Properties of the bar were assessed in terms of ease of release from the mould and surface appearance. The results are shown in Table 1 below. It can be seen that the injection moulding apparatus of FIG. 1 is suitable for manufacturing detergent bars which are readily released from the mould after a short period of time and of satisfactory to excellent surface appearance.

Example 2

An apparatus according to FIG. 2 comprising a BETOL co-rotating twin screw extruder with 40 mm diameter screws and eight temperature control zones was used. The temperatures of the connection valve 17 and the injection head assembly (18,19,20) was also controlled.

A novel piston type injection unit according to the present invention was fitted at the end of the screw extruder. Detergent compositions as set out below were prepared in molten form and fed to the extruder using a Bran and Luebbe metering pump. The molten feed was at a temperature of 90 to 95° C. It was maintained in a stirred, heated feed pot.

During filling the mould was moved either manually, or hydraulically using a mould moving mechanism according to FIG. 4 of the present application.

Detergent formulations D and E were injection moulded.

| | wt % active |
|---|---|
| Formulation D was as follows: | |
| Directly Esterified Fatty Isethionate | 38.0 |
| Propylene glycol | 21.5 |
| Sodium Stearate | 12.2 |
| Sodium Palmitate | 12.2 |
| Water | 16.1 |
| TOTAL | 100.0 |
| Formulation E was as follows: | |
| Directly esterified fatty isethionate | 27.8 |
| Sodium stearate | 14.6 |
| Propylene glycol | 17.8 |
| Stearic acid | 12.8 |
| PEG 8000 | 9.7 |
| Coco amido propyl betaine | 4.9 |
| Paraffin wax | 2.9 |
| Sodium isethionate | 0.4 |
| Water | 5.6 |
| Minor additives (preservatives,perfume,colour etc) | 2.5 |
| TOTAL | 100.0 |

The apparatus was used to form detergent bars over a range of temperatures which were subsequently released from the moulds and checked for mould release properties and surface quality. The results are shown in Table 2. It is clear that good quality detergent bars can be manufactured using the apparatus of FIG. 2.

TABLE 1

| | Zone temps (° C.) | | | Fill | Mould | Mould temp | Ease of | |
|---|---|---|---|---|---|---|---|---|
| Formul'n | inlet | middle | exit | temp (° C.) | vol (ml) | before fill (° C.) | release | Surface appearance |
| A | 40 | 50 | 50 | 50 | ~75 | 10–15 | Very easy | Excellent |
| B | 45 | 55 | 65 | 60.6 | ~75 | 10 | Easy | Satisfactory; flow lines visible; good gloss |
| C | 40 | 50 | 50 | 46.8 | ~100 | 11 | Easy | Satisfactory, some flow lines visible |

TABLE 2

| Formul'n | Zone temps. (° C.)(*1) | Fill temp (° C.) | Mould vol (ml) | Mould temp before fill (° C.)(*2) | Ease of release | Surface appearance | Comments |
|---|---|---|---|---|---|---|---|
| D | 32, 100, 80, 70, 70, 70, 70, 70, 45, 45 | 49 | 100 | 7 | Easy | Good; slight flow lines | Mould moved manually |
| E | 30, 100, 80, 70, 70, 70, 65, 35, 55, 55 | 47 | 100 | 10 | Tacky, but released | Satisfactory | Mould moved hydraulically |
| E | 30, 100, 80, 70, 70, 70, 62, 47, 60, 60 | 60 | 75 | −5 | Easy | Good | Mould moved hydraulically |
| E | 27, 100, 80, 73, 65, 61, 37, 45, 60, 60 | 61 | 75 | 20 | Very minor adhesion | Good | Mould moved hydraulically |

Notes on Tables 1 and 2
(*1)temperature zones are 1,2 (feed), 3,4,5,6,7,8 (mixing elements), 9 (valve connection and injection head) 10 (cylinders).
(*2)Mould cooling was achieved by contact with solid carbon dioxide (for temperatures in the region of −5° C.), ice/water bath (for temperatures up to 10° C.) and water or ambient air (for temperatures in excess of 10° C.)

Example 3

An apparatus comprising a BETOL co-rotating twin-screw extruder with 40 mm diameter screws, eight temperature controlled zones, and a low shear, in-line injection head was used as depicted in FIG. 3. Detergent composition E was prepared in molten form (95° C.) and held in a stirred, heated feed pot. It was then fed into Zone E of the extruder using a Bran & Luebbe metering pump. Detergent composition B was fed at ambient temperature to zone D as 4 mm diameter noodles using a Ktron feeder. The maximum injection pressure and the holding time were recorded. The results are given in Table 3.

The detergent compositions were in a semi-solid state when they entered the mould. In all the runs, the mould was at ambient temperature before fill and cooling was effected by packing solid $CO_2$ around the outside of the mould for the period of time specified plus maintaining the mould at ambient temperature for a further 5 minutes.

These runs illustrate that the surface quality of the bars can be improved by the use of a holding pressure after filling, without compromising the release of the bars from the mould.

TABLE 3

| Formul'n | Zone temperatures (° C.)(*1) | Fill temp (° C.) | Mould vol (g) | Cooling solid CO. (mins) | Ease of release | Hold time(s) | Max inject pressure (psig) | Appearance |
|---|---|---|---|---|---|---|---|---|
| E | 70, 70, 70, 70, 70 70, 70, 70, 70, 70 | 70 | 100 | 2 | Easy | 6 | 44 | Greasy surface; good bar |
| E | 31, 95, 80, 70, 60 50, 45, 55, 55, 55 | 53 | 125 | 0.5 | Slight adhesion to one side | 0 | 206 | Dimpled, mainly on one sided |
| E | 31, 95, 80, 70, 60 50, 45, 55, 55, 55 | 53 | 125 | 0.5 | Easy | 1 | 260 | Very slightly dimpled |
| E | 31, 95, 80, 70, 60 50, 45, 55, 55, 55 | 52 | 125 | 0.5 | Easy | 6 | 204 | No dimples; very good surface |
| E | 31, 95, 80, 70, 60 50, 45, 55, 55, 55 | 53 | 125 | 0.5 | Easy | 6 | 234 | No dimples; very good surface |
| B | 50, 50, 50, 50, 50 50, 50, 50, 50, 50 | 50 | 100 | 0.5 | Easy | 6 | 771 | satisfactory; some flow lines |

Notes on Table 3
(*1)Temperature zones are 1,2 (feed), 3,4,5,6,7,8 (mixing elements), 9 (valve connection and accumulator) and 10 (injection head).

Example 4

Detergent formulation E was injection moulded with the simultaneous addition of a benefit agent.

Using the equipment of FIG. 3, two silicone oils (viscosity 100 and 60000 centistokes) were introduced into the twin screw extruder in separate experiments. The flow rate of silicone oil was controlled by a Seepex pump so as to give an approximate concentration of 2%–15% w/w silicone oil in the final bar. For some runs dye was added to the silicone oil stream, so that its presence in the bar could be visually verified during experimentation. The detergent compositions were in a semi-solid state when entering the mould. The bars formed released from the moulds as easily as their counterparts without oil, under similar conditions.

The mould was at ambient temperature before fill and cooling was effected as described in Example 3.

High-resolution proton NMR was used to determine the distribution of silicone oil in bars. NMR measurement was performed on samples extracted from six different sites in the bar (3within and 3 on the surface). Results are shown in Table 4.

Subsequent microscope analysis indicated that the silicone oil was present in the bars in irregularly shaped zones rather than droplets. A guide to the average volume of the zones was obtained by warming a sample, allowing the oil to flow into droplets, and measuring their diameter. This varied with the viscosity of the oil (lower viscosity, smaller zones) and the mixing regime in the dosing region (plain helical screw flights gave larger zones than kneading/mixing elements) indicating that control of zone size was possible.

TABLE 4

| Formul'n | Zone temperatures (° C.) | Fill temp (° C.) | Silicone oil (cSt) | Oil dosed (zone) | Max inject pressure (psig) | Hold time(s) | Cooling solid CO. (min) | Comments |
|---|---|---|---|---|---|---|---|---|
| E | 32, 95, 80, 72 65, 60, 55, 55 55, 55 | 55 | 60,000 10% w/w | G | 299 | 6 | 1 | Smooth, dry surface; good finish; slight dimpling; easy release. |
| E | 32, 95, 80, 72 65, 60, 55, 55 55, 55 | 55 | 60,000 5% w/w | G | 323 | 6 | 1 | Good to excellent bar; easy release; oil on mould surface. |
| E | 32, 95, 80, 72 65, 60, 55, 55 55, 55 | 55 | 60,000 2% w/w | G | 332 | 6 | 1 | Good to excellent bar; $H^1$-NMR showed the presence of 1.69–1.95 wt % silicone oil (aver. 1.85 wt %) |
| E | 32, 95, 80, 72 65, 60, 55, 55 55, 55 | 55 | 100 15% w/w | K | 358 | 6 | 1 | Easy release; good surface; slightly sticky feel; $H^1$-NMR showed the presence of 14.2-17.7 wt % silicone oil (aver. 15.8 wt %) |
| E | 32, 95, 80, 72 65, 60, 55, 55 55, 55 | 53 | 100 10% w/w | K | 376 | 6 | 1 | Easy release; greasy residue on mould surface; excellent bar. |
| E | 30, 100, 80, 70, 70, 60, 55 45, 50, 50 | 50 | 100 | K | | | | No mixing elements; distribution of mobile phase in the bar determined using $H^1$-MRI. |

Example 5

Using the equipment of FIG. 3, bars of Formulation F were formed by injection moulding.

| Formulation F was as follows: | wt % active |
|---|---|
| Directly esterified fatty isethionate | 7.60 |
| Sodium stearate | 4.75 |
| SLES-3EO | 11.87 |
| Fatty acids | 4.26 |
| PEG 8000 | 9.49 |
| Coco amido propyl betaine | 11.87 |
| Glycerol monostearate | 20.64 |
| Glycerol monolaurate | 20.64 |
| Water | 3.79 |
| Sunflower oil | 4.75 |
| Minor additives up to 100% | |
| TOTAL | 100.00 |

The detergent compositions were in a semi-solid state when entering the mould. The temperature of the moulds at fill was ambient.

TABLE 5

| Form'n | Zone temperatures (° C.) | Fill temp (° C.) | Mould vol (g) | Cooling solid CO. (mins) | Ease of release | Hold time(s) | Max. inject. pressure (psig) | Appearance |
|---|---|---|---|---|---|---|---|---|
| F | 24, 55, 55, 50, 50 45, 45, 40, 40, 40 | 40 | 100 | 5 | Difficult to release | 6 | 232 | Good bar |
| F | 31, 70, 70, 55, 45 35, 35, 35, 35, 35 | 35 | 100 | 1 | Slight adhesion to logo | 0 | 138 | Good bar |

Example 6

A ram extruder as shown in FIG. 5 was used to injection mould two representative personal wash detergent formulations G and H.

| | wt % active |
|---|---|
| Formulation G was as follows: | |
| Soap* | 76.7 |
| Water | 22.0 |
| $TiO_2$ | 0.3 |
| Perfume | 1.0 |
| TOTAL | 100.0 |
| Formulation H was as follows: | |
| Sodium cocoyl isethionate | 49.5 |
| Stearic acid | 20.0 |
| Coconut fatty acid | 3.0 |
| Sodium isethionate | 4.7 |
| Linear alkylbenzene sulphate (LAS) | 2.0 |
| Sodium chloride | 0.4 |
| Soap** | 8.3 |
| Sodium stearate | 3.0 |
| Perfume | 1.3 |
| Miscellaneous | 0.7 |
| Water | 7.1 |
| TOTAL | 100.0 |

*Chain length distribution of fat charge of soap is given in Table 3.
**82/18 blend of sodium tallowate and sodium cocoate.

TABLE 6

| Chain length distribution of fat charge of soap in Formulation G. | |
|---|---|
| Chain Length | % by weight |
| C8 | 0.81 |
| C10 | 1.06 |
| C12 | 15.70 |
| C14 | 5.80 |
| C16 | 38.22 |
| C16:1 | 0.07 |
| C18 | 7.05 |
| C18:1 | 26.30 |
| C18:2 | 4.01 |
| C20 | 0.19 |
| Others | 0.79 |
| Total | 100 |

Detergent composition was filled into the reservoir and the reservoir heated until the feed material attained the desired temperature. The dies were assembled and the runner was connected to the gate of the injection mould. The other end of the runner was screwed into the bottom of the reservoir. The runner and the mould were heated to and maintained at the desired temperature using a blanket-type heater. The temperature at the outer surface of the mould was measured using a washer type Fe/k thermocouple.

Once the feed temperature and the mould temperature reached desired values, a vacuum pump was connected to the threaded portion of the exit capillary (60) of the mould and the mould was evacuated prior to filling. A moisture trap was provided in the vacuum pump line in order to prevent moisture from entering the vacuum pump oil. A vacuum gauge in the vacuum pump line measured the vacuum in the mould cavity.

The plunger (54) was then switched on and the hot feed was injected into the mould at a controlled speed, the velocity being displayed on an instrumentation panel in mm/min. The rated pressure capacity of the plunger apparatus was 735 psi and once the pressure exceeded this value the auto shut off system of the instrument automatically stopped the plunger.

The pressure, as measured by the indicator-transmitter (56), was displayed on the instrumentation panel in millivolt units over a range of 0–1013 mV, corresponding to 0–735 psi pressure drop across the injection moulding unit. An in-line computer recorded the pressure-transmitter output in millivolts as a function of time.

After the mould had been filled and the plunger had switched off, the mould still attached to the runner was detached from the reservoir and allowed to cool. The two dies of the mould were opened and the hardened detergent bars ejected.

Mould cooling was done under forced air cooling conditions with air at about 27° C. and at an air velocity of about 3.6 ms. The feed entering the mould was in a semi-solid, partially structured form containing liquid crystalline phases.

Table 7 shows the preferred operating conditions for injection moulding of these formulations.

TABLE 7

| Optimum operating conditions | | | | |
|---|---|---|---|---|
| Formulation | Feed temp (° C.) | Mould temp before fill (° C.) | Measured pressure (psi) | Cooling time (min) |
| G | 90 | 90 | 735 | 20 |
| H | 60 | 40 | 735 | 20 |

It was found that tablets with good surface finish and acceptable logo imprint quality could be obtained using the above discussed process of the invention.

A comparison of end user properties of injection moulded Formulation H versus a conventional shear worked and extruded detergent bar control was made. The injection moulded and control bars were of equal weight (about 75 g) and similar shape (rectangular). Table 8 shows the end user properties, such as rate of wear, mush, lather, and cracking of the two bars.

The rate of wear was comparable for the two tablets. The lather volume for the injection moulded bar was higher than that for the control. The mush rating was poor for the injection moulded bar. No cracking was observed for both the bars.

TABLE 8

Assessment of injection moulded (I-M) Formulation G vis-a-vis a conventional shear-worked and extruded control

| | Dimension | Control tablet | I-M tablet | Calc. 't' | Table 't' | Remarks |
|---|---|---|---|---|---|---|
| Wear | g | 28.3 | 31.9 | 31.9 | 2.78 | Not significant |
| % Wear | — | 27.8 | 25.1 | 2.4 | 2.78 | Not Significant |
| Mush at depth at 4 days | mm | 2.7 | 4.8 | 9.2 | 2.78 | Significant |
| Cracking | Number on 0–14 scale | No cracking found in any of the tablets | | | | |
| Lather | ml | | | | | |

TABLE 8-continued

Assessment of injection moulded (I-M) Formulation G vis-a-vis a conventional shear-worked and extruded control

| | Dimension | Control tablet | I-M tablet | Calc. 't' | Table 't' | Remarks |
|---|---|---|---|---|---|---|
| in soft water | | 413 | 436 | 9.2 | 2.78 | Significant |
| in hard water | | 339 | 384 | 12.7 | 2.78 | Significant |

What is claimed is:

1. A process for forming a detergent bar, said process comprising:

(a) a first step of applying pressure to a detergent composition to deliver the detergent composition to a substantially closed mould;

(b) causing the detergent composition to enter the mould at an entry point, the pressure of the detergent composition at the entry point being greater than 29.4 psi under the action of an injector head for at least part of the time over which the detergent composition is entering the mould;

(c) cooling the detergent composition in the mould to form the said bar;

(d) removing the bar from the mould.

2. A process according to claim 1, wherein the detergent composition is at least partially structured when it enters the mould.

* * * * *